(12) United States Patent
Joo et al.

(10) Patent No.: US 8,023,068 B2
(45) Date of Patent: Sep. 20, 2011

(54) OPTICAL SHEET, BACKLIGHT UNIT, AND LIQUID CRYSTAL DISPLAY

(75) Inventors: Hanbitt Joo, Cheongju-si (KR); Kabjin Hwang, Cheongju-si (KR)

(73) Assignee: LG Electronics Inc., Seoul (KR)

( * ) Notice: Subject to any disclaimer, the term of this patent is extended or adjusted under 35 U.S.C. 154(b) by 249 days.

(21) Appl. No.: 12/359,058

(22) Filed: Jan. 23, 2009

(65) Prior Publication Data

US 2009/0284686 A1 Nov. 19, 2009

(30) Foreign Application Priority Data

May 16, 2008 (KR) .................. 10-2008-0045656
May 16, 2008 (KR) .................. 10-2008-0045666
May 26, 2008 (KR) .................. 10-2008-0048664

(51) Int. Cl.
*G02F 1/1335* (2006.01)
(52) U.S. Cl. .......... 349/64; 362/334; 362/339; 362/607; 362/626
(58) Field of Classification Search ............ 349/64; 362/334, 339, 606, 607, 626
See application file for complete search history.

(56) References Cited

U.S. PATENT DOCUMENTS

| 5,969,867 | A * | 10/1999 | Fukushima et al. | 359/581 |
|---|---|---|---|---|
| 7,483,224 | B2 * | 1/2009 | Kimura et al. | 359/831 |
| 2006/0227323 | A1 | 10/2006 | Goto | 356/336 |
| 2006/0262667 | A1 | 11/2006 | Lah et al. | 369/1 |
| 2007/0285588 | A1 | 12/2007 | Tsai et al. | 349/5 |
| 2007/0285604 | A1 | 12/2007 | Kim et al. | 349/122 |
| 2007/0285785 | A1 | 12/2007 | Lin | 359/599 |
| 2008/0291363 | A1 * | 11/2008 | Onishi | 349/64 |

FOREIGN PATENT DOCUMENTS

| CN | 1957291 A | 5/2007 |
|---|---|---|
| CN | 101078782 A | 11/2007 |
| CN | 201017050 Y | 2/2008 |
| JP | 2001-226418 A | 8/2001 |
| JP | 2007-328314 A | 12/2007 |
| JP | 2007-328321 A | 12/2007 |
| KR | 10-2001-0101834 A | 11/2001 |
| KR | 10-2004-0079027 A | 9/2004 |
| KR | 10-2006-0057984 A | 5/2006 |
| KR | 10-2007-0054582 A | 5/2007 |
| KR | 10-2007-0081144 A | 8/2007 |
| KR | 10-2007-0098456 A | 10/2007 |
| WO | WO 2005/119351 A1 | 12/2005 |
| WO | WO 2007/129415 A1 | 11/2007 |

OTHER PUBLICATIONS

Korean Office Action dated Apr. 28, 2010 for Application No. 10-2008-0048664. Chinese Office Action dated May 12, 2010 fort Application No. 200910006542.9.
Korean Office Action dated Jul. 30, 2009 for Korean Patent Application No. 10-2008-0045656.
Korean Office Action dated Jul. 30, 2009 for Korean Patent Application No. 10-2008-0045666.
European Search Report dated Aug. 4, 2009 for European Patent Application No. 09000583.6.
Korean Notice of Allowance dated Oct. 29, 2010 issued in Application No. 10-2008-0048664.

* cited by examiner

*Primary Examiner* — Richard Kim
(74) *Attorney, Agent, or Firm* — Ked & Assocaites LLP

(57) ABSTRACT

An optical sheet, a backlight unit including the optical sheet, and a liquid crystal display including the backlight unit are provided. The optical sheet includes a base film including a first surface and a second surface opposite the first surface and a plurality of projections on the base film. A first thickness between the first surface and the second surface is different from a second thickness between the first surface and the second surface.

16 Claims, 17 Drawing Sheets

OPTICAL SHEET, BACKLIGHT UNIT, AND LIQUID CRYSTAL DISPLAY

This application claims the benefit of Korean Patent Application Nos. 10-2008-0048664, 10-2008-0045666, and 10-2008-0045656 filed May 26, 2008, May 16, 2008, and May 16, 2008, respectively, the entire contents of which are hereby incorporated by reference.

BACKGROUND

1. Field

Embodiments relate to an optical sheet, a backlight unit including the optical sheet, and a liquid crystal display including the backlight unit.

2. Description of the Related Art

A display field may visually display information of various electrical signals. In the display field, various types of flat panel displays having excellent characteristics such as thin profile, lightness in weight, and low power consumption have been introduced. Additionally, flat panel displays are replacing cathode ray tubes (CRT).

Examples of flat panel displays include a liquid crystal display (LCD), a plasma display panel (PDP), a field emission display (FED), and an electroluminescence display (ELD). The liquid crystal display may be used as a display panel of notebooks, monitors of personal computers, and/or TV monitors because of a high contrast ratio and excellent display characteristics of a moving picture.

The liquid crystal display may be considered as a light receiving display. The liquid crystal display may include a liquid crystal display panel that displays an image and a backlight unit that is positioned under the liquid crystal display panel to provide the liquid crystal display panel with light.

The backlight unit may include a light source and an optical sheet. The optical sheet may include a diffusion sheet, a prism, or a protective sheet.

If uniformity of a luminance of light provided by the backlight unit is reduced, the display quality of the liquid crystal display may be deteriorated.

Accordingly, in the related art, the diffusion sheet is used to improve the uniformity of the luminance. The diffusion sheet may allow light to be uniformly diffused throughout a whole display area of the liquid crystal display panel. However, it is difficult to secure a light diffusivity as well as the uniformity of the luminance using only the diffusion sheet.

SUMMARY

Embodiments provide an optical sheet capable of achieving a uniform luminance and improving a light diffusivity by changing a shape of a base film, a backlight unit including the optical sheet, and a liquid crystal display including the backlight unit.

In one aspect, there is an optical sheet comprising a base film including a first surface and a second surface opposite the first surface, and a plurality of projections on the base film, wherein T1 represents a first thickness between the first surface and the second surface, and T2 represents a second thickness between the first surface and the second surface, wherein the first thickness T1 is different from the second thickness T2.

The first thickness T1 may be a thickness measured along a vector substantially perpendicular to one surface of the base film, and the second thickness T2 may be a thickness substantially parallel to the first thickness T1.

At least one of the first and second surfaces may have peaks and valleys.

The first and second thicknesses T1 and T2 may substantially satisfy the following equation: $0.1\ \mu m \leq |T1-T2| \leq 10\ \mu m$.

The optical sheet may further comprise a first primer layer on the base film.

The optical sheet may further comprise a second primer layer under the base film.

The first primer layer or the second primer layer may be formed of at least one selected from the group consisting of acrylic-based, ester-based, and urethane-based polymer materials.

A thickness of the first primer layer may be approximately 5 nm to 300 nm.

A thickness of the second primer layer may be approximately 5 nm to 300 nm.

The plurality of projections may include a plurality of first beads.

The plurality of projections may include one of a prism, a microlens, and a lenticular lens.

The plurality of projections may include a plurality of peaks, a plurality of valleys, and a base portion under the valleys.

A height of the base portion may be approximately 5% to 50% of a height of one of the plurality of peaks.

The plurality of peaks, the plurality of valleys, and the base portion may form an integral body of the plurality of projections.

The prism may include a plurality of peaks and a plurality of valleys, and at least one of the peaks and the valleys meanders in an uneven pattern.

The prism may include a plurality of peaks and a plurality of valleys, and a height of at least one of the peaks varies along a longitudinal direction of the prism.

The optical sheet may further comprise a protective layer under the base film, the protective layer including a resin and plurality of second beads.

In another aspect, there is a backlight unit comprising a light source, and an optical sheet on the light source, the optical sheet including a base film including a first surface and a second surface opposite the first surface, and a plurality of projections on the base film, wherein T1 represents a first thickness between the first surface and the second surface, and T2 represents a second thickness between the first surface and the second surface, wherein the first thickness T1 is different from the second thickness T2.

In another aspect, there is a liquid crystal display comprising a light source, an optical sheet on the light source, the optical sheet including a base film including a first surface and a second surface opposite the first surface, and a plurality of projections on the base film, wherein T1 represents a first thickness between the first surface and the second surface, and T2 represents a second thickness between the first surface and the second surface, wherein the first thickness T1 is different from the second thickness T2, and a liquid crystal panel on the optical sheet.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF EMBODIMENTS

Reference will now be made in detail embodiments of the invention examples of which are illustrated in the accompanying drawings.

Figure 1:
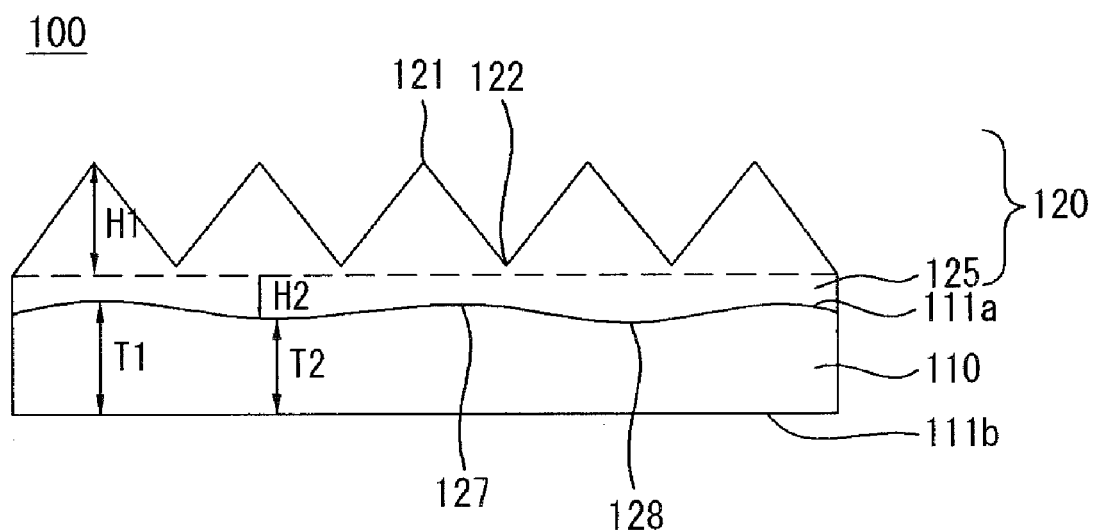
FIGS. 1 and 2 are cross-sectional views of an optical sheet according to a first exemplary embodiment.
Figure 2:
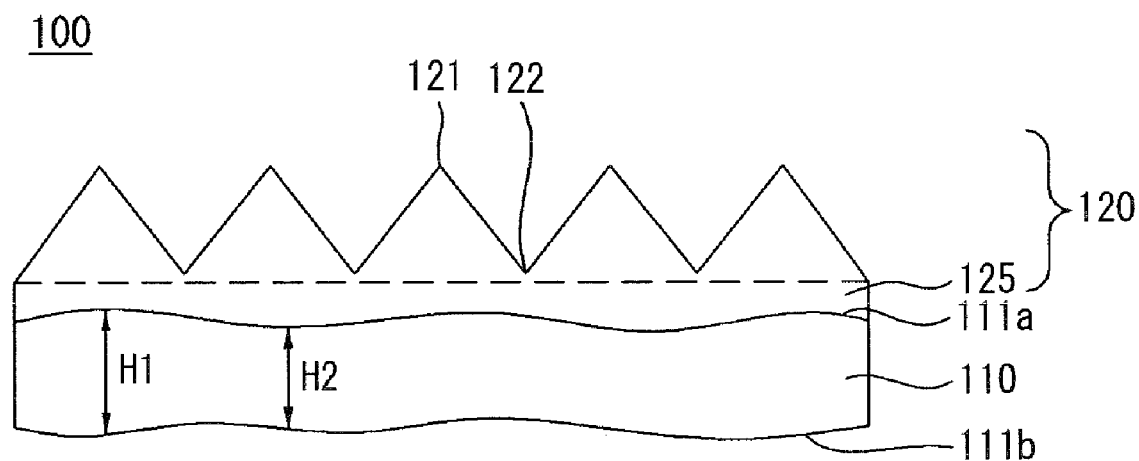

FIGS. 1 and 2 are cross-sectional views of an optical sheet according to a first exemplary embodiment.

As shown in FIGS. 1 and 2, an optical sheet 100 according to the first exemplary embodiment may include a base film 110 and a prism portion 120 on the base film 110.

The base film 110 may transmit light coming from a light source. The base film 110 may be formed of a light transmitting material, such as polyethylene terephthalate, polycarbonates, polypropylene, polyethylene, polystyrene, and polyepoxy, for example. Other materials may also be used.

The base film 110 may include a first surface 111a and a second surface 111b opposite the first surface 111a. At least one of the first surface 111a and the second surface 111b may have a curved or non-flat surface. FIG. 1 shows the first surface 111a having a curved or non-flat surface. The entire first surface 111a may have a curved or non-flat surface. Alternatively, a portion of the first surface 111a, for example, a remaining portion except an edge of the first surface 111a may have a curved or non-flat surface.

The first surface 111a of the base film 110 may have a wave shape. The first surface 111a may have a structure in which peaks 127 and valleys 128 of the first surface 111a are alternately formed in a repeated manner.

Pitches of the peaks 127 of the first surface 111a may be uniform. Differences between heights of the peaks 127 and the valleys 128 formed adjacent to each other may be uniform. The pitches of the peaks 127 and the height differences between the peaks 127 and the valleys 128 may be properly selected depending on a thickness and size of the base film 110, uniformity of a desired luminance, and a light diffusivity, etc.

The curved surface of the first surface 111a may be formed using one of a calendaring processing, an injection processing, a casting molding processing, etc. The curved surface may also be formed using another technique. The base film 110 may be approximately 50 μm to 300 μm thick to achieve a thin profile of a backlight unit. The thickness of the base film 110 may be an average value of a distance between one of the peaks 127 of the first surface 111a and the second surface 111b and a distance between one of the valleys 128 of the first surface 111a and the second surface 111b. When the thickness of the base film 110 is equal to or greater than 50 μm, the thin profile of the backlight unit may be achieved to a maximum level to an extent that mechanical properties and thermal resistance of the optical sheet 100 are not reduced (or are not substantially reduced). When the thickness of the base film 110 is equal to or less than 300 μm, the thin profile of the backlight unit may be maximally achieved, and the mechanical properties and the thermal resistance of the optical sheet 100 may be maximized (and/or increased).

The base film 110 may have a first thickness T1 between the first surface 111a and the second surface 111b and a second thickness T2 between the first surface 111a and the second surface 111b. The first thickness T1 may be a thickness measured along a vector substantially perpendicular to one surface of the base film 110, and the second thickness T2 may be a thickness substantially parallel to the first thickness T1. The first thickness Ti may be different from the second thickness T2.

The first and second thicknesses T1 and T2 may substantially satisfy the following equation: $0.1\ \mu m \leq |T1-T2| \leq 10\ \mu m$.

The following Table 1 shows diffusion characteristics and luminance characteristics of the optical sheet 100 depending on a relationship between the first and second thicknesses T1 and T2. In the following Table 1, X, ○, and ⊚ represent bad, good, and excellent states of the characteristics, respectively.

TABLE 1

| \|T1 − T2\| (μm) | Diffusion Characteristics | Luminance Characteristics |
|---|---|---|
| 0.05 | X | ⊚ |
| 0.1 | ○ | ⊚ |
| 1 | ○ | ⊚ |
| 3 | ○ | ○ |
| 5 | ○ | ○ |
| 7 | ○ | ○ |
| 9 | ⊚ | ○ |
| 10 | ⊚ | ○ |
| 15 | ⊚ | X |

As indicated in Table 1, when the first and second thicknesses T1 and T2 satisfy the following equation: $0.1\ \mu m \leq |T1-T2|$, light from the light source may be diffused because of the non-flat surfaces on one surface of the base film 110. When the first and second thicknesses T1 and T2 satisfy the following equation: $|T1-T2| \leq 10\ \mu m$, a reduction in the luminance resulting from a large height difference of the base film 110 may be prevented (and/or minimized).

The prism portion 120 may focus the light from the light source. The prism portion 120 may have a triangle-shaped section. Because the prism portion 120 may be linearly formed along a longitudinal direction of the prism portion 120, the prism portion 120 may have a triangle prism shape. Other shapes may be used.

The prism portion 120 may include a plurality of peaks 121, a plurality of valleys 122, and a base portion 125 under the valleys 122. The plurality of peaks 121, the plurality of valleys 122, and the base portion 125 may form an integral body of the prism portion 120.

A height H2 of the base portion 125 may be approximately 5% to 50% of a height H1 of one of the peaks 121 of the prism portion 120. When the height H2 of the base portion 125 is equal to or greater than 5% of the height H1 of one of the peaks 121, the base film 110 may be prevented from being damaged by pressure in fabrication of the prism portion 120. When the height H2 of the base portion 125 is equal to or less than 50% of the height H1 of one of the peaks 121, a reduction in a transmittance of light from the light source resulting from the thick base portion 125 may be prevented.

As shown in FIG. 2, the first and second surfaces 111a and 111b of the base film 110 may have a curved or non-flat surface. Alternatively, the second surface 111b of the base film 110 may have a curved or non-flat surface.

In exemplary embodiments that will be described below, the first surface of the base film may have a curved or non-flat surface. However, the first and second surfaces of the base film may have a curved or non-flat surface, or the second surface of the base film may have a curved or non-flat surface.

Figure 3:
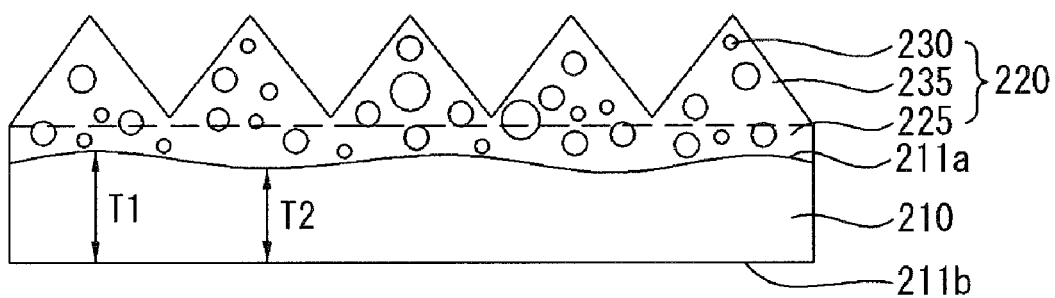
FIG. 3 is a cross-sectional view of an optical sheet according to a second exemplary embodiment.

FIG. 3 is a cross-sectional view of an optical sheet according to a second exemplary embodiment.

As shown in FIG. 3, an optical sheet 200 according to the second exemplary embodiment may include a base film 210 and a prism portion 220 on the base film 210. The prism portion 220 may include a plurality of first beads 230.

The base film 210 may include a first surface 211a and a second surface 211b opposite the first surface 211a. The base film 210 may have a first thickness T1 between the first surface 211a and the second surface 211b and a second thickness T2 between the first surface 211a and the second surface 211b. The first thickness T1 may be a thickness measured along a vector substantially perpendicular to one surface of the base film 210, and the second thickness T2 may be a thickness substantially parallel to the first thickness T1. The first thickness T1 may be different from the second thickness T2.

Since a configuration of the base film 210 is similar to or the same as that described in the first exemplary embodiment, a further description may be briefly made or may be entirely omitted.

The prism portion 220 may include a base portion 225, a resin 235, and a plurality of first beads 230. Since a configuration of the base portion 225 is similar to or the same as that described in the first exemplary embodiment, a further description may be briefly made or may be entirely omitted.

The resin 235 may be acrylic resin. For example, the resin 235 may use acrylic-based resin, such as methyl methacrylate, ethyl methacrylate, isobutyl methacrylate, normal butyl methacrylate, normal butyl methyl methacrylate, acrylic acid, methacrylic acid, hydroxyethyl methacrylate, hydroxypropyl methacrylate, hydroxyethyl acrylate, acrylamide, methylol acrylamide, glycidyl methacrylate, ethyl acrylate, isobutyl acrylate, normal butyl acrylate, 2-ethylhexyl acrylate polymer, 2-ethylhexyl acrylate copolymer or 2-ethylhexyl acrylate terpolymer. In addition, the resin 235 may use unsaturated polyester, urethane-based resin, epoxy-based resin, and melamine-based resin. Other materials may be used.

The plurality of first beads 230 may diffuse and transmit light from the light source. The first beads 230 may use organic particles and inorganic particles with a high transmittance and a high diffusivity. For example, the organic particles may be formed by forming acrylic-based particles, olefin-based particles such as polyethylene, polystyrene, polypropylene, and particles of copolymer and homopolymer of acrylic-based particles and olefin-based particles and then covering the particles with a different kind of monomer. Examples of the acrylic-based material include methyl methacrylate, ethyl methacrylate, isobutyl methacrylate, normal butyl methacrylate, normal butyl methyl methacrylate, acrylic acid, methacrylic acid, hydroxyethyl methacrylate, hydroxypropyl methacrylate, hydroxyethyl acrylate, acrylamide, methylol acrylamide, glycidyl methacrylate, ethyl acrylate, isobutyl acrylate, normal butyl acrylate, 2-ethylhexyl acrylate polymer, 2-ethylhexyl acrylate copolymer or 2-ethylhexyl acrylate terpolymer. The inorganic particles may be formed of silicon oxide, aluminum oxide, titanium oxide, zirconium oxide, magnesium fluoride, for example. Other materials may be used.

The first beads 230 may be provided in an amount of about 1 to 10 parts by weight based on the resin 235. When an amount of the first beads 230 based on the resin 235 is equal to or greater than 1 part by weight, it is easy to diffuse the light from the light source. When an amount of the first beads 230 based on the resin 235 is equal to or less than 10 parts by weight, a reduction in a transmittance of the light from the light source may be prevented.

Diameters of the first beads 230 distributed inside the resin 235 may be non-uniform. The first beads 230 may be completely distributed inside the resin 235 not to project from the surface of the resin 235.

A backlight unit including the optical sheets according to the first and second exemplary embodiments operates as follows.

Light produced by a light source is incident on the optical sheet. A portion of the light incident on the optical sheet collides with the first beads of the prism portion, and a travel path of the light changes. Another portion of the light incident on the optical sheet passes through an emitting surface of the prism portion to travel toward a liquid crystal display panel.

The light, whose the travel path changes by colliding with the first beads, collides with the first beads adjacent to the colliding first beads, and a travel path of the light changes again. A portion of the light, whose the travel path changes twice, passes through the emitting surface of the prism portion to travel toward the liquid crystal display panel. Another portion of the light, whose the travel path changes twice, collides with the first beads, and a travel path of the light changes again.

Finally, the light passing through the emitting surface of the prism portion is uniformly incident on the liquid crystal display panel.

As described above, light incident on the optical sheet is reflected several times by the plurality of first beads distributed inside the prism portion and is diffused while a travel path of the light changes. Therefore, the optical sheet may focus the light and improve the luminance.

Figure 4:
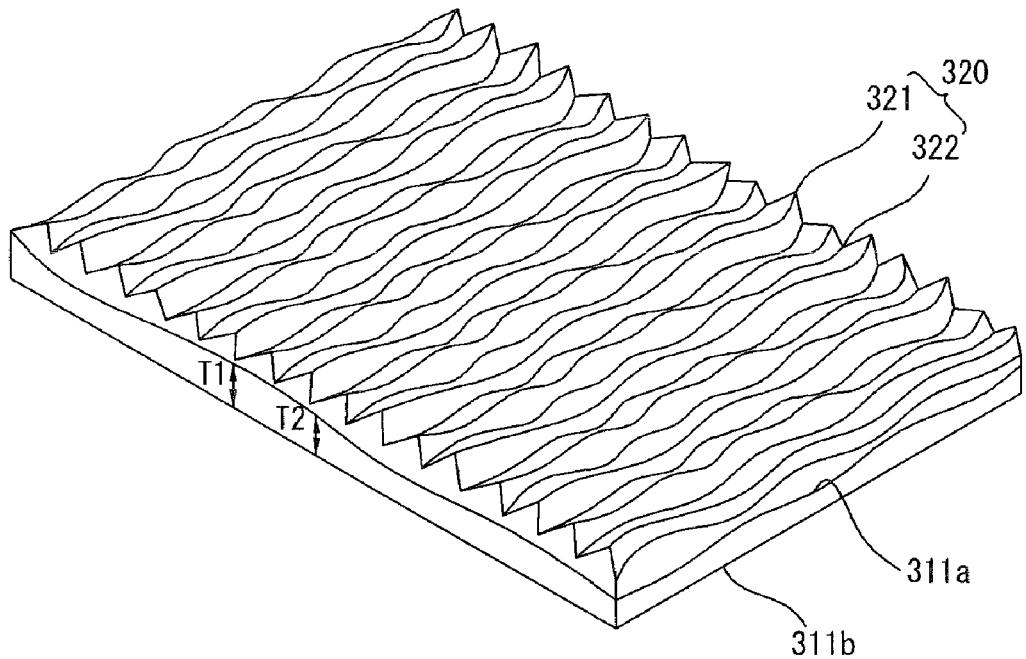
FIGS. 4 and 5 show an optical sheet according to a third exemplary embodiment.
Figure 5:
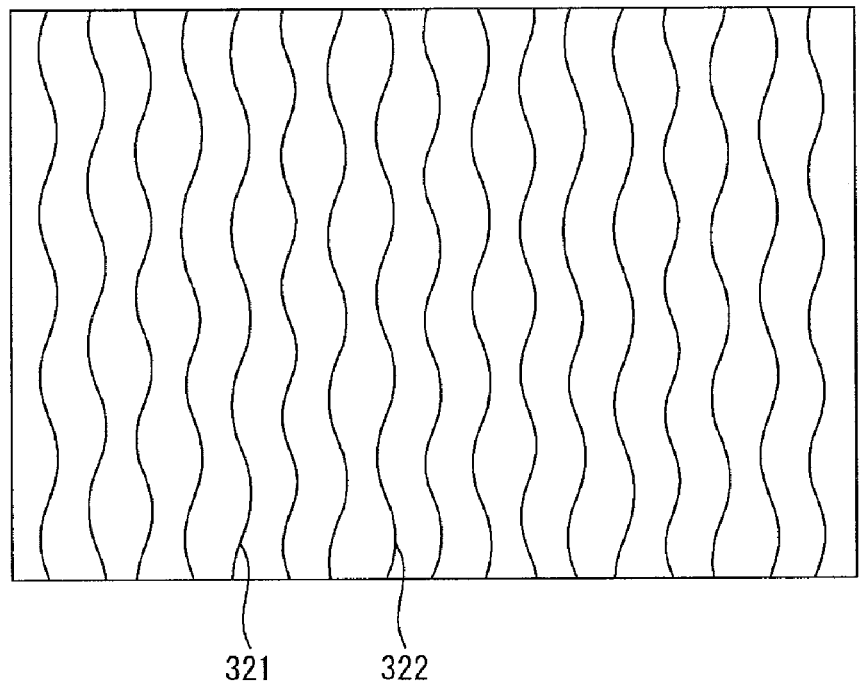

FIGS. 4 and 5 show an optical sheet according to a third exemplary embodiment.

As shown in FIGS. 4 and 5, an optical sheet 300 according to the third exemplary embodiment may include a base film 310 and a prism portion 320 on the base film 310. The prism portion 320 may include a plurality of peaks 321 and a plurality of valleys 322.

The base film 310 may include a first surface 311a and a second surface 311b opposite the first surface 311a. The base film 310 may have a first thickness T1 between the first surface 311a and the second surface 311b and a second thickness T2 between the first surface 311a and the second surface 311b. The first thickness T1 may be a thickness measured along a vector substantially perpendicular to one surface of the base film 310, and the second thickness T2 may be a thickness substantially parallel to the first thickness T1. The first thickness T1 may be different from the second thickness T2.

Since a configuration of the base film 310 is similar to or the same as that described in the above exemplary embodiments, a further description may be briefly made or may be entirely omitted.

The prism portion 320 may have a triangle-shaped section. Pitches between the peaks 321 of the prism portion 320 may be approximately 20 μm to 300 μm.

The peaks 321 may meander in an uneven pattern along a longitudinal direction of the prism portion 320. An average horizontal amplitude of the peaks 321 may be approximately 1 μm to 20 μm.

Further, the valley 322 may meander in an uneven pattern along the longitudinal direction of the prism portion 320. An average horizontal amplitude of the valleys 322 may be approximately 1 μm to 20 μm.

Heights of the peaks 321 as measured from a bottom surface of the prism portion 320 may uniformly or non-uniformly vary along the longitudinal direction of the prism portion 320. An average difference between the heights of the peaks 321 may be approximately 1 μm to 20 μm. Heights of the valleys 322 may uniformly or non-uniformly vary along the longitudinal direction of the prism portion 320.

Accordingly, when another sheet on the optical sheet 300 physically contacts the optical sheet 300, the peaks 321 of the prism portion 320 are not crushed. Hence, the image quality of the liquid crystal display may be improved.

Figure 6:
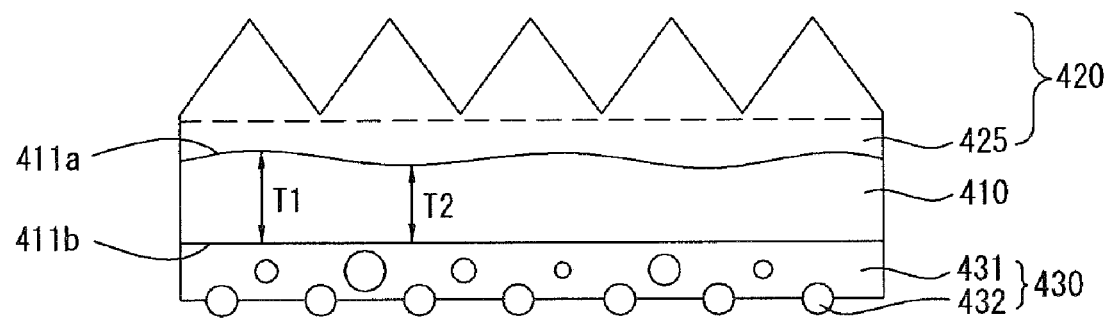
FIG. 6 is a cross-sectional view of an optical sheet according to a fourth exemplary embodiment.

FIG. 6 is a cross-sectional view of an optical sheet according to a fourth exemplary embodiment.

As shown in FIG. 6, an optical sheet 400 according to the fourth exemplary embodiment may include a base film 410, a prism portion 420 on the base film 410, and a protective layer 430 under the base film 410.

The base film 410 may include a first surface 411a and a second surface 411b opposite the first surface 411a. The base film 410 may have a first thickness T1 between the first surface 411a and the second surface 411b and a second thickness T2 between the first surface 411a and the second surface 411b. The first thickness T1 may be different from the second thickness T2.

Since configurations of the base film 410 and the prism portion 420 including a base portion 425 are similar to or the same as those described in the above exemplary embodiments, a farther description may be briefly made or may be entirely omitted.

The protective layer 430 may improve a thermal resistance of the optical sheet 400. The protective layer 430 may include a resin 431 and a plurality of second beads 432 distributed inside the resin 431.

The resin 431 may use transparent acrylic-based resin with excellent thermal resistance and excellent mechanical characteristics. The resin 431 may be similar to or the same as that described in the above exemplary embodiments.

The second beads 432 may be formed of the same material as or a different material from the resin 431. The second beads 432 may be provided in an amount of about 10 to 50 parts by weight based on the resin 431.

Diameters of the second beads 432 may be properly selected depending on the thickness of the base film 410 and may be approximately 1 μm to 10 μm.

In the fourth exemplary embodiment, the diameters of the second beads 432 may be uniform or non-uniform. The second beads 432 may be uniformly or non-uniformly distributed inside the resin 431.

The second beads 432 may be formed of the same material as or a different material from the first beads described in the second exemplary embodiment.

The protective layer 430 may prevent the optical sheet from being deformed by light coming from a light source. The resin 431 having the excellent thermal resistance may prevent the optical sheet from crumpling. Even if the optical sheet is deformed at a high temperature, the optical sheet may be restored to its original state at a normal temperature. The protective layer 430 may prevent generation of a flaw on the optical sheet caused by an external impact or mechanical force.

Figure 7:
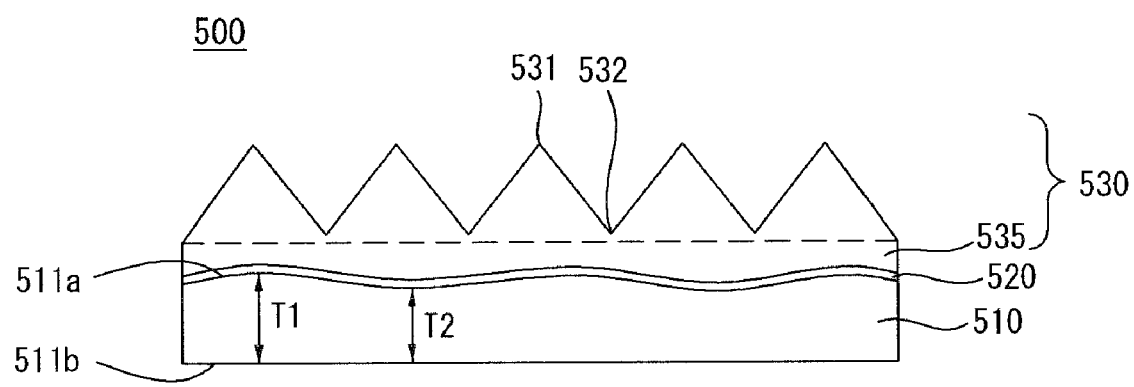
FIGS. 7 and 8 are cross-sectional views of an optical sheet according to a fifth exemplary embodiment.
Figure 8:
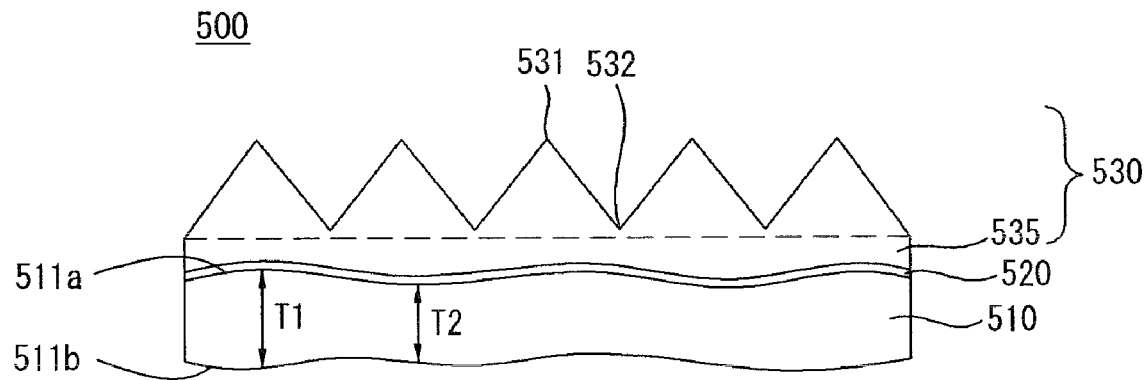

FIGS. 7 and 8 are cross-sectional views of an optical sheet according to a fifth exemplary embodiment.

As shown in FIGS. 7 and 8, an optical sheet 500 according to the fifth exemplary embodiment may include a base film 510, a first primer layer 520 on the base film 510, and a prism portion 530 on the first primer layer 520.

A description of configurations and components identical or equivalent to those described in the above exemplary embodiments will not repeat in the fifth exemplary embodiment.

The base film 510 may include a first surface 511a and a second surface 511b opposite the first surface 511a. The base film 510 may have a first thickness T1 between the first surface 511a and the second surface 511b and a second thickness T2 between the first surface 511a and the second surface 511b. The first thickness T1 may be different from the second thickness T2.

The first primer layer 520 may be formed on the base film using a primer processing. The primer processing may be a processing to perform a polymer processing on a general polymer film. The primer processing may improve an adhesive strength between the polymer film and an ultraviolet (UV) resin. Acrylic-based polymer, ester-based polymer, or urethane-based polymer may be used in the primer processing. A water-soluble polymer material may be used in the primer processing to prevent the risk of fire. The primer processing may be performed by coating the above-described polymer material on the base film.

The first primer layer 520 thus formed may have a thickness of approximately 5 nm to 300 nm. When the thickness of the first primer layer 520 is equal to or greater than 5 nm, a reduction in the adhesive strength resulting from the very thin first primer layer 520 may be prevented. When the thickness of the first primer layer 520 is equal to or less than 300 nm, coating stains generated in the primer processing or a lump phenomenon of the polymer material may be prevented.

The following Table 2 shows light transmittance characteristics and an adhesive strength of the optical sheet depending on the thickness of the first primer layer 520. In Table 2, X, ○, and ⊚ represent bad, good, and excellent states of the characteristics, respectively.

TABLE 2

| Thickness of First Primer Layer (nm) | Light Transmittance Characteristics | Adhesive Strength |
|---|---|---|
| 3 | ⊚ | X |
| 5 | ⊚ | ○ |
| 10 | ⊚ | ○ |

TABLE 2-continued

| Thickness of First Primer Layer (nm) | Light Transmittance Characteristics | Adhesive Strength |
|---|---|---|
| 30 | ◎ | ○ |
| 90 | ○ | ○ |
| 130 | ○ | ○ |
| 200 | ○ | ◎ |
| 250 | ○ | ◎ |
| 300 | ○ | ◎ |
| 350 | X | ◎ |
| 400 | X | ◎ |

As indicated in Table 2, a luminance and a color coordinate may be improved by finely adjusting the thickness of the first primer layer 520.

Accordingly, when the primer processing is performed between the base film 510 and the prism portion 530, the transmittance and the adhesive strength of the optical sheet 500 may be improved by adjusting the thickness of the first primer layer 520.

The first primer layer 520 may be used to attach the base film 510 to the prism portion 530 through not a physical attachment using an adhesive but a chemical bonding. More specifically, the base film 510 may be formed of poly-based material, and the prism portion 530 may be formed of UV-curing resin. If the base film 510 is attached to the prism portion 530 through the physical attachment, it is difficult to expect the excellent adhesive strength because an adhesive interface between the base film 510 and the prism portion 530 is smooth. However, when the base film 510 is attached to the prism portion 530 through the chemical bonding by forming the first primer layer 520 between the base film 510 and the prism portion 530, the chemical bonding may provide the adhesive strength stronger than the physical attachment. Further, the adhesive interface between the base film 510 and the prism portion 530 may be protected.

The following reaction formula 1 indicates a chemical reaction formula between a resin and urethane depending on UV curing when the prism portion 530 uses a resin and the first primer layer 520 uses urethane.

[Reaction Formula 1]

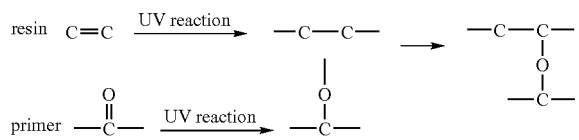

The prism portion 530 may include a plurality of peaks 531, a plurality of valleys 532, and a base potion 535 under the valleys 532. The plurality of peaks 531, the plurality of valleys 532, and the base portion 535 may form an integral body of the prism portion 530. A height of the base portion 535 may be approximately 5% to 50% of a height of one of the peaks 531.

Figure 9:
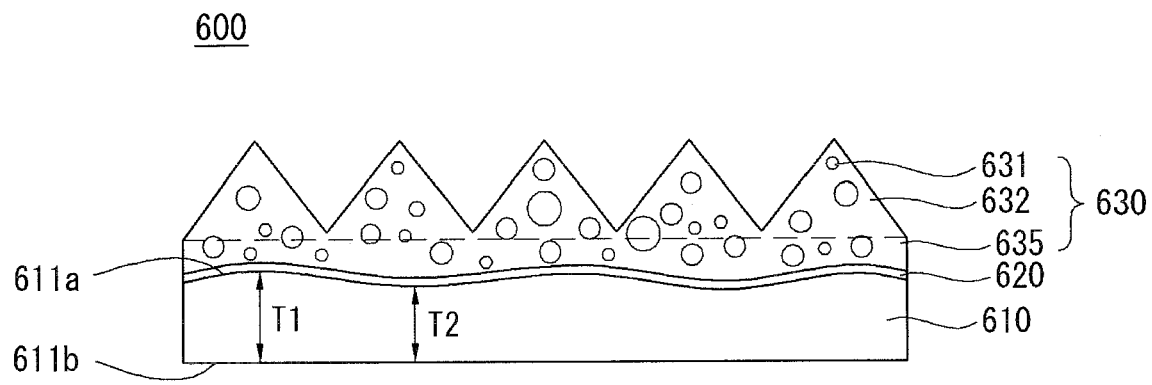
FIG. 9 is a cross-sectional view of an optical sheet according to a sixth exemplary embodiment.

FIG. 9 is a cross-sectional view of an optical sheet according to a sixth exemplary embodiment.

As shown in FIG. 9, an optical sheet 600 according to the sixth exemplary embodiment may include a base film 610, a first primer layer 620 on the base film 610, and a prism portion 630 on the first primer layer 620. The prism portion 630 may include a plurality of first beads 631.

The base film 610 may include a first surface 611a and a second surface 611b opposite the first surface 611a. The base film 610 may have a first thickness T1 between the first surface 611a and the second surface 611b and a second thickness T2 between the first surface 611a and the second surface 611b. The first thickness T1 may be different from the second thickness T2.

Since configurations of the base film 610 and the first primer layer 620 are similar to or the same as those described in the above exemplary embodiments, a further description may be briefly made or may be entirely omitted.

The prism portion 630 may include a base portion 635, a resin 632, and the plurality of first beads 631. Since a configuration of the base portion 635 is similar to or the same as that described in the above exemplary embodiments, a further description may be briefly made or may be entirely omitted.

The resin 632 may be acrylic resin. For example, the resin 632 may use acrylic-based resin, such as methyl methacrylate, ethyl methacrylate, isobutyl methacrylate, normal butyl methacrylate, normal butyl methyl methacrylate, acrylic acid, methacrylic acid, hydroxyethyl methacrylate, hydroxypropyl methacrylate, hydroxyethyl acrylate, acrylamide, methylol acrylamide, glycidyl methacrylate, ethyl acrylate, isobutyl acrylate, normal butyl acrylate, 2-ethylhexyl acrylate polymer, 2-ethylhexyl acrylate copolymer or 2-ethylhexyl acrylate terpolymer. In addition, the resin 632 may use unsaturated polyester, urethane-based resin, epoxy-based resin, and melamine-based resin. Other materials may be used.

The plurality of first beads 631 may diffuse and transmit light from the light source. The first beads 631 may use organic particles and inorganic particles with a high transmittance and a high diffusivity. For example, the organic particles may be formed by forming acrylic-based particles, olefin-based particles such as polyethylene, polystyrene, polypropylene, and particles of copolymer and homopolymer of acrylic-based particles and olefin-based particles and then covering the particles with a different kind of monomer. Examples of the acrylic-based material include methyl methacrylate, ethyl methacrylate, isobutyl methacrylate, normal butyl methacrylate, normal butyl methyl methacrylate, acrylic acid, methacrylic acid, hydroxyethyl methacrylate, hydroxypropyl methacrylate, hydroxyethyl acrylate, acrylamide, methylol acrylamide, glycidyl methacrylate, ethyl acrylate, isobutyl acrylate, normal butyl acrylate, 2-ethylhexyl acrylate polymer, 2-ethylhexyl acrylate copolymer or 2-ethylhexyl acrylate terpolymer. The inorganic particles may be formed of silicon oxide, aluminum oxide, titanium oxide, zirconium oxide, magnesium fluoride, for example. Other materials may be used.

The first beads 631 may be provided in an amount of about 1 to 10 parts by weight based on the resin 632. When an amount of the first beads 631 based on the resin 631 is equal to or greater than 1 part by weight, it is easy to diffuse light from the light source. When an amount of the first beads 631 based on the resin 632 is equal to or less than 10 parts by weight, a reduction in a transmittance of the light from the light source may be prevented.

Diameters of the first beads 631 distributed inside the resin 632 may be non-uniform. The first beads 631 may be completely distributed inside the resin 632 not to project from the surface of the resin 632.

Figure 10:
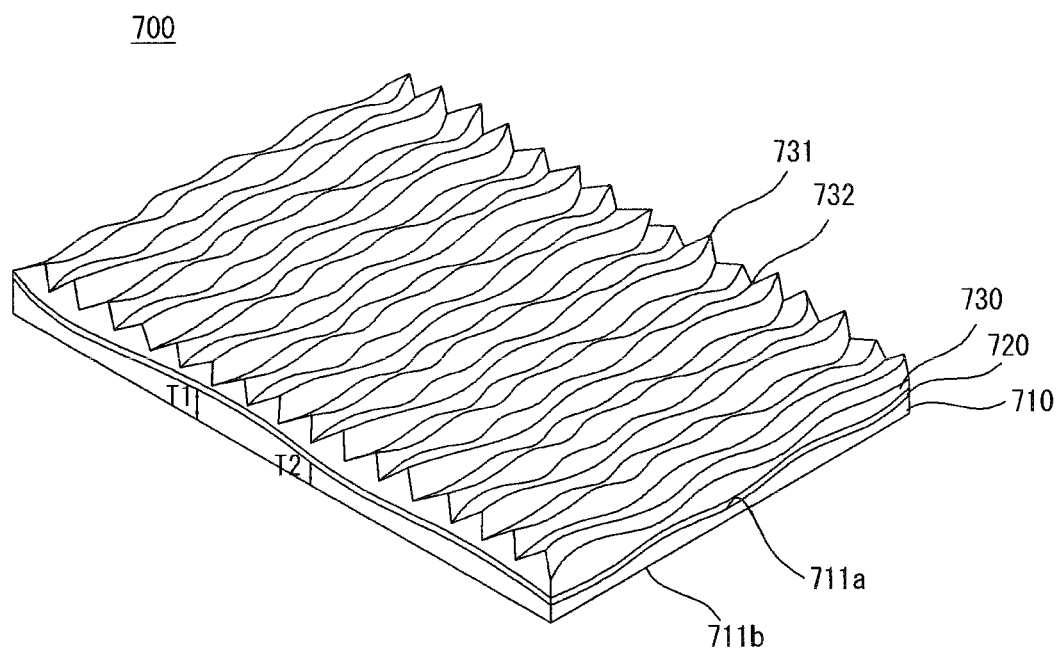
FIGS. 10 and 11 show an optical sheet according to a seventh exemplary embodiment.
Figure 11:
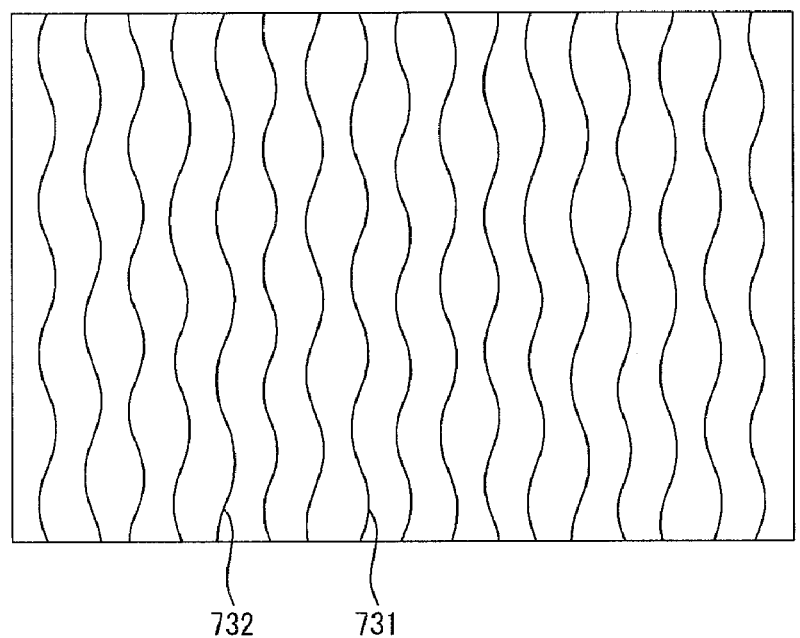

FIGS. 10 and 11 show an optical sheet according to a seventh exemplary embodiment.

As shown in FIGS. 10 and 11, an optical sheet 700 according to the seventh exemplary embodiment may include a base film 710, a first primer layer 720 on the base film 710, and a prism portion 730 on the first primer layer 720. The prism portion 730 may include a plurality of peaks 731 and a plurality of valleys 732.

The base film 710 may include a first surface 711a and a second surface 711b opposite the first surface 711a. The base film 710 may have a first thickness T1 between the first surface 711a and the second surface 711b and a second thickness T2 between the first surface 711a and the second surface 711b. The first thickness T1 may be different from the second thickness T2.

Since configurations of the base film 710 and the first primer layer 720 are similar to or the same as those described in the above exemplary embodiments, a further description may be briefly made or may be entirely omitted.

The peaks 731 of the prism portion 730 may meander in an uneven pattern along a longitudinal direction of the prism portion 730. An average horizontal amplitude of the peaks 731 may be approximately 1 μm to 20 μm.

Further, the valley 732 of the prism portion 730 may meander in an uneven pattern along the longitudinal direction of the prism portion 730. An average horizontal amplitude of the valleys 732 may be approximately 1 μm to 20 μm.

Heights of the peaks 731 as measured from a bottom surface of the prism portion 730 may uniformly or non-uniformly vary along the longitudinal direction of the prism portion 730. An average difference between the heights of the peaks 731 may be approximately 1 μm to 20 μm. Heights of the valleys 732 may uniformly or non-uniformly vary along the longitudinal direction of the prism portion 720.

Accordingly, when another sheet on the optical sheet 700 physically contacts the optical sheet 700, the peaks 731 of the prism portion 730 are not crushed. Hence, the image quality of the liquid crystal display can be improved.

Figure 12:
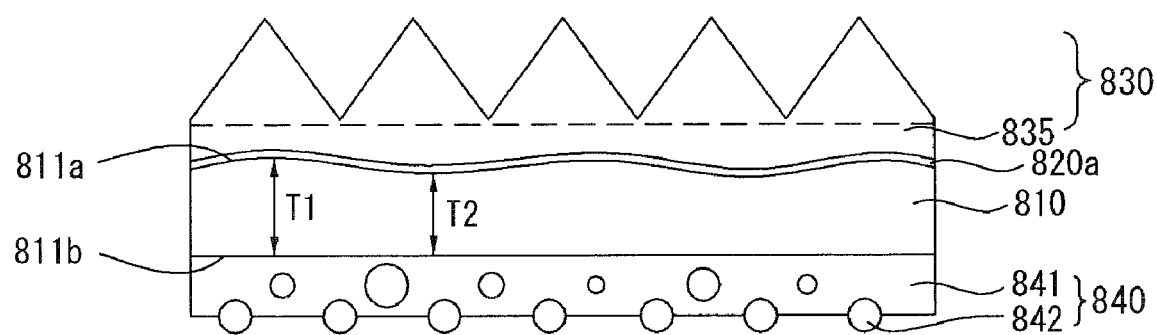
FIGS. 12 and 13 are cross-sectional views of an optical sheet according to an eighth exemplary embodiment.
Figure 13:
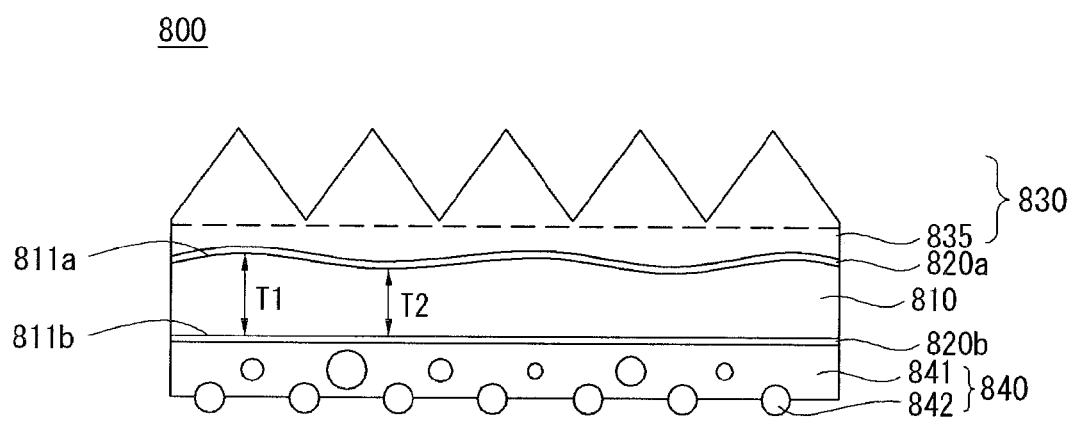

FIGS. 12 and 13 are cross-sectional views of an optical sheet according to an eighth exemplary embodiment.

As shown in FIG. 12, an optical sheet 800 according to the eighth exemplary embodiment may include a base film 810, a first primer layer 820a on the base film 810, a prism portion 830 on the first primer layer 820a, and a protective layer 840 under the base film 810.

The base film 810 may include a first surface 811a and a second surface 811b opposite the first surface 811a. The base film 810 may have a first thickness T1 between the first surface 811a and the second surface 811b and a second thickness T2 between the first surface 811a and the second surface 811b. The first thickness T1 may be different from the second thickness T2.

Since configurations of the base film 810, the first primer layer 820a, and the prism portion 830 including a base portion 835 are similar to or the same as those described in the above exemplary embodiments, a further description may be briefly made or may be entirely omitted.

The protective layer 840 may improve a thermal resistance of the optical sheet 800. The protective layer 840 may include a resin 841 and a plurality of second beads 842 distributed inside the resin 841.

The resin 841 may use transparent acrylic-based resin with excellent thermal resistance and excellent mechanical characteristics. The resin 841 may be similar to or the same as that described in the above exemplary embodiments.

The second beads 842 may be formed of the same material as or a different material from the resin 841. The second beads 842 may be provided in an amount of about 10 to 50 parts by weight based on the resin 841.

Diameters of the second beads 842 may be properly selected depending on the thickness of the base film 810 and may be approximately 2 μm to 10 μm.

In the eighth exemplary embodiment, the diameters of the second beads 842 may be uniform or non-uniform. The second beads 842 may be uniformly or non-uniformly distributed inside the resin 841.

The second beads 842 may be formed of the same material as or a different material from the first beads described in the above exemplary embodiments.

As shown in FIG. 13, the optical sheet 800 may further include a second primer layer 820b under the base film 810. The protective layer 840 may be positioned under the second primer layer 820b.

A configuration of the second primer layer 820b is similar to or the same as that of the first primer layer 820a. The second primer layer 820b may improve an adhesive strength between the base film 810 and the protective layer 840.

The protective layer 840 may prevent the optical sheet from being deformed by light coming from a light source. The protective layer 840 may prevent generation of a flaw on the optical sheet caused by an external impact or mechanical force.

Figure 14:
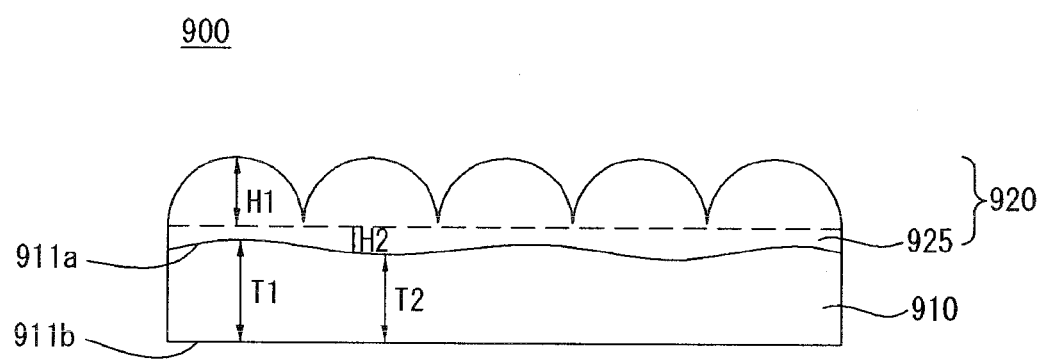
FIGS. 14 and 15 are cross-sectional views of an optical sheet according to a ninth exemplary embodiment.
Figure 15:
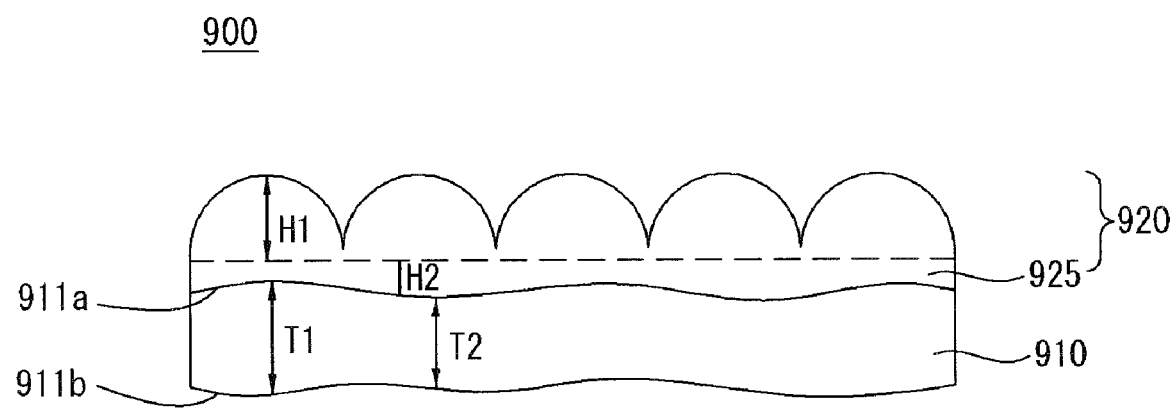

FIGS. 14 and 15 are cross-sectional views of an optical sheet according to a ninth exemplary embodiment.

As shown in FIGS. 14 and 15, an optical sheet 900 according to the ninth exemplary embodiment may include a base film 910 and a lens portion 920 on the base film 910.

Since a configuration of the base film 910 is similar to or the same as that described in the above exemplary embodiments, a further description may be briefly made or may be entirely omitted.

The base film 910 may include a first surface 911a and a second surface 911b opposite the first surface 911a. The base film 910 may have a first thickness T1 between the first surface 911a and the second surface 911b and a second thickness T2 between the first surface 911a and the second surface 911b. The first thickness T1 may be different from the second thickness T2.

The lens portion 920 may be formed of transparent polymer resin, such as acrylic, polycarbonate, polypropylene, polyethylene, and polyethyleneterephthalate. The lens portion 920 may transmit light coming from the outside.

The lens portion 920 may further include a base portion 925. The lens portion 920 and the base portion 925 may form an integral body.

A height H2 of the base portion 925 may be approximately 5% to 50% of a height H1 of the lens portion 920.

The following Table 3 shows light transmittance characteristics and a defective check of the optical sheet depending on a percentage of the height H2 of the base portion 925 based on the height H1 of the lens portion 920. In Table 3, X, ○, and ⊚ represent bad, good, and excellent states of the characteristics, respectively. Further, in the defective check, ○ represents that there are defects, and X represents that there are no defects.

TABLE 3

| Percentage of Height of Base Portion Based on Height of Lens Portion (%) | Light Transmittance Characteristics | Defective Check |
|---|---|---|
| 1 | ⊚ | ○ |
| 3 | ⊚ | ○ |
| 5 | ⊚ | X |
| 10 | ○ | X |
| 20 | ○ | X |
| 30 | ○ | X |
| 40 | ○ | X |
| 50 | ○ | X |

TABLE 3-continued

| Percentage of Height of Base Portion Based on Height of Lens Portion (%) | Light Transmittance Characteristics | Defective Check |
|---|---|---|
| 60 | X | X |
| 70 | X | X |
| 80 | X | X |

As indicated in Table 3, when the height H2 of the base portion 925 is equal to or greater than 5% of the height H1 of the lens portion 920, the base film 910 may be prevented from being damaged by pressure in fabrication of the lens portion 920. When the height H2 of the base portion 925 is equal to or less than 50% of the height H1 of the lens portion 920, a reduction in a transmittance of light from the light source resulting from the thick base portion 925 may be prevented.

FIGS. 16 to 19 show a shape of the lens portion 920. The lens portion 920 may focus light from the light source.

Figure 16:
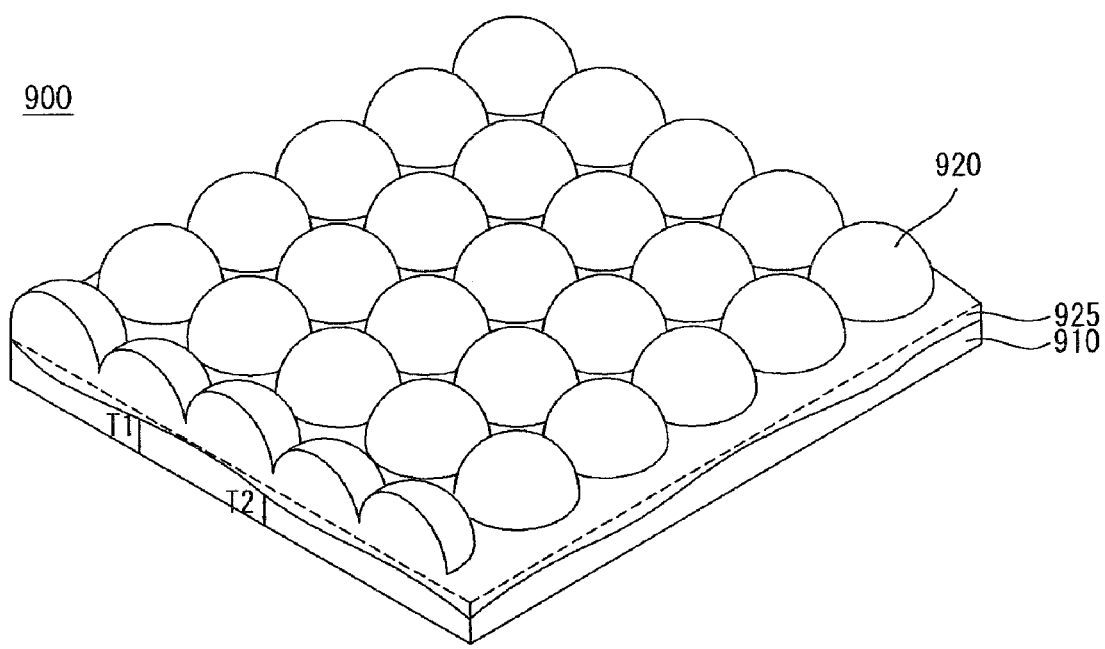
FIGS. 16 to 19 are perspective views showing a lens portion of an optical sheet.
Figure 17:
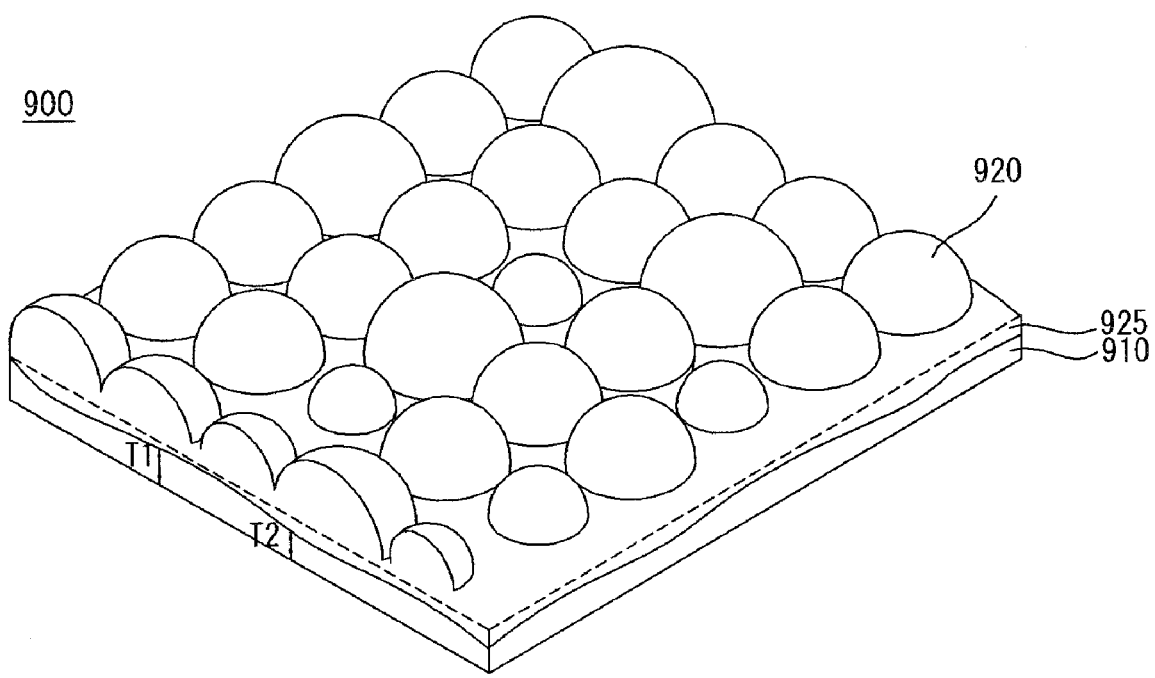
Figure 18:
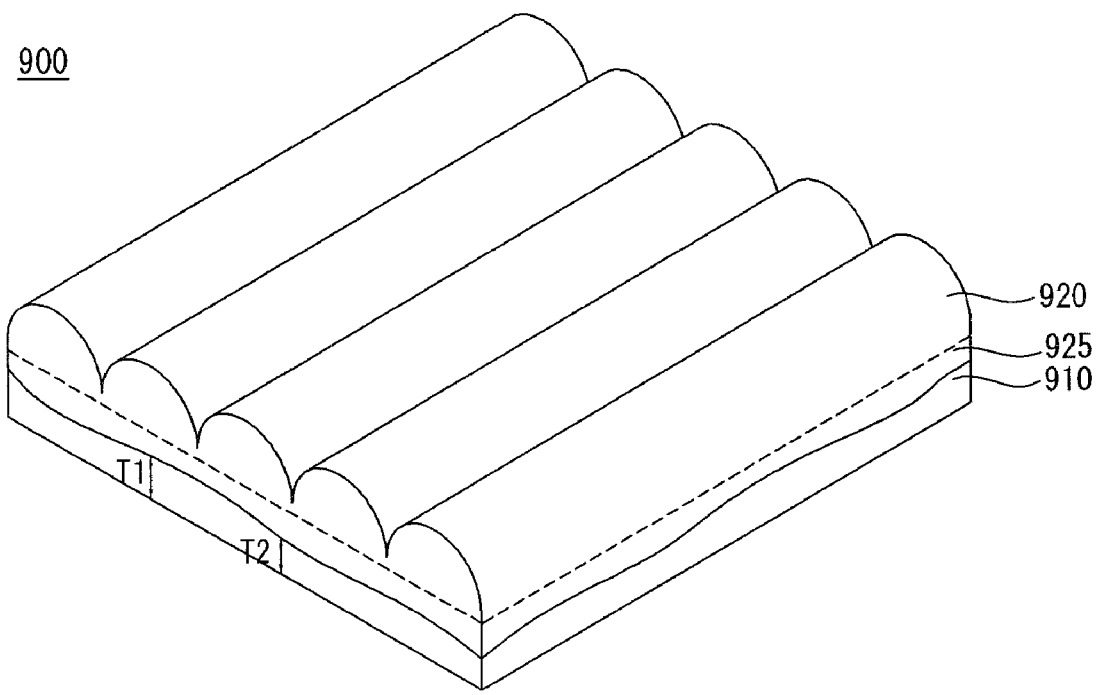
Figure 19:
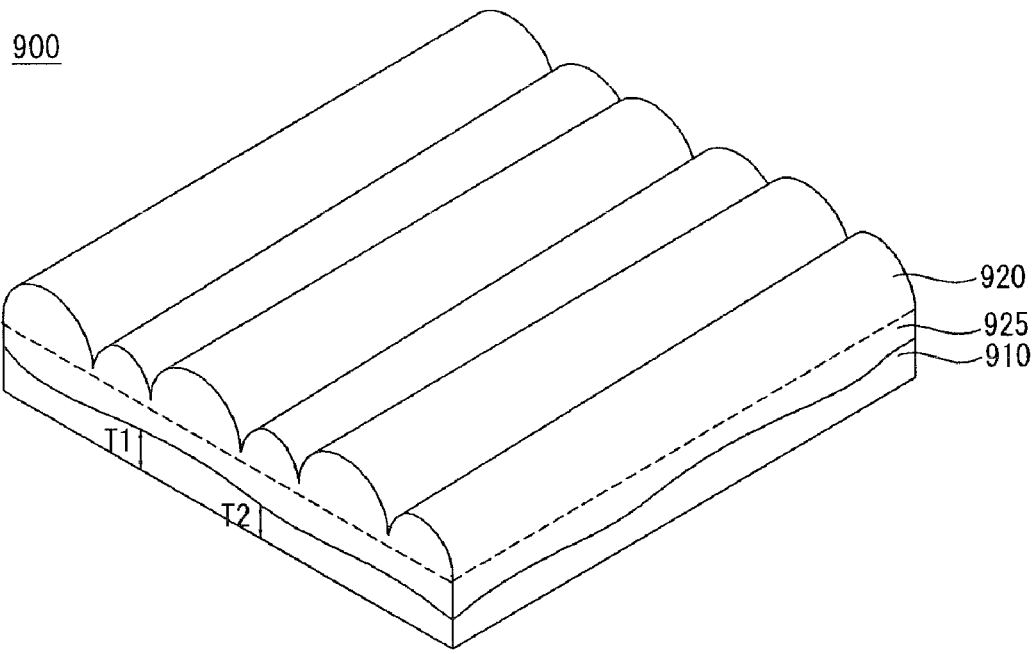

As shown in FIGS. 16 and 17, the lens portion 920 may include a plurality of microlenses. As shown in FIGS. 18 and 19, the lens portion 920 may include a plurality of lenticular lenses.

The microlenses may have an embossed form of a hemispherical shape on one surface of the base film 910.

A diffusivity, a refractive index, a focusing level, etc. of the microlenses may change depending on a pitch and a density of the microlenses. Diameters and heights of the microlenses may be uniform or non-uniform.

The diameters of the microlenses may be approximately 20 μm to 200 μm. The microlenses may occupy approximately 50% to 90% of a whole area of the optical sheet 900. Other diameters and percentages may also be used.

As described above, if the microlenses have the embossed form of the hemispherical shape, a portion of light coming from the outside (for example, a portion of light coming from the light source underlying the microlenses) is uniformly refracted by the hemispherical microlenses at all of azimuth angles and then is transmitted by the hemispherical microlenses. Therefore, the portion of the light coming from the light source may be diffused in an upward manner and then focused.

The lenticular lenses may have a semicircular section. Unlike the pattern type microlenses, the lenticular lenses may have a continuous form along a longitudinal direction of the lenticular lenses. For example, the lenticular lenses may have a form as if a plurality of semicircular cylinders lie on the base film 910.

Pitches and heights of the lenticular lenses may be uniform or non-uniform. Other pitches and heights may be used.

In exemplary embodiments that will be described below, the lens portion may include the lenticular lenses. For example, the lens portion may include the microlenses.

Figure 20:
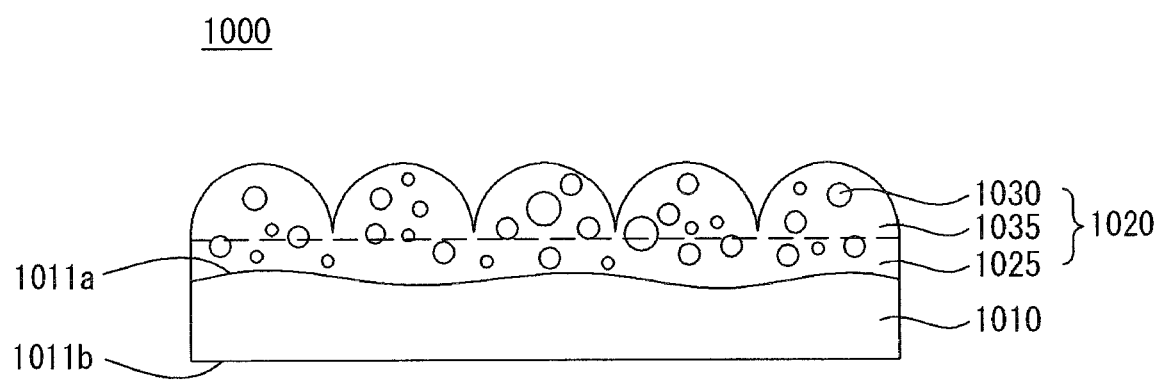
FIG. 20 is a cross-sectional view of an optical sheet according to a tenth exemplary embodiment.

FIG. 20 is a cross-sectional view of an optical sheet according to a tenth exemplary embodiment.

As shown in FIG. 20, an optical sheet 1000 according to the tenth exemplary embodiment may include a base film 1010 and a lens portion 1020 on the base film 1010. The lens portion 1020 may include a plurality of first beads 1030.

The base film 1010 may include a first surface 1011a and a second surface 1011b opposite the first surface 1011a. At least one of the first surface 1011a and the second surface 1011b may have a curved or non-flat surface. FIG. 20 shows the first surface 1011a having a curved or non-flat surface. The base film 1010 may have a first thickness T1 between the first surface 1011a and the second surface 1011b and a second thickness T2 between the first surface 1011a and the second surface 1011b. The first thickness T1 may be different from the second thickness T2.

Since a configuration of the base film 1010 is similar to or the same as that described in the above exemplary embodiments, a further description may be briefly made or may be entirely omitted.

The lens portion 1020 may be a lenticular lens or a microlens. The lens portion 1020 may include a base layer 1025, a resin 1035, and a plurality of first beads 1030.

The resin 1035 may be acrylic resin. For example, the resin 1035 may use acrylic-based resin, such as methyl methacrylate, ethyl methacrylate, isobutyl methacrylate, normal butyl methacrylate, normal butyl methyl methacrylate, acrylic acid, methacrylic acid, hydroxyethyl methacrylate, hydroxypropyl methacrylate, hydroxyethyl acrylate, acrylamide, methylol acrylamide, glycidyl methacrylate, ethyl acrylate, isobutyl acrylate, normal butyl acrylate, 2-ethylhexyl acrylate polymer, 2-ethylhexyl acrylate copolymer or 2-ethylhexyl acrylate terpolymer. In addition, the resin 1035 may use unsaturated polyester, urethane-based resin, epoxy-based resin, and melamine-based resin. Other materials may be used.

The plurality of first beads 1030 may diffuse and transmit light from a light source. The first beads 1030 may use organic particles and inorganic particles with a high transmittance and a high diffusivity. For example, the organic particles may be formed by forming acrylic-based particles, olefin-based particles such as polyethylene, polystyrene, polypropylene, and particles of copolymer and homopolymer of acrylic-based particles and olefin-based particles and then covering the particles with a different kind of monomer. Examples of the acrylic-based material include methyl methacrylate, ethyl methacrylate, isobutyl methacrylate, normal butyl methacrylate, normal butyl methyl methacrylate, acrylic acid, methacrylic acid, hydroxyethyl methacrylate, hydroxypropyl methacrylate, hydroxyethyl acrylate, acrylamide, methylol acrylamide, glycidyl methacrylate, ethyl acrylate, isobutyl acrylate, normal butyl acrylate, 2-ethylhexyl acrylate polymer, 2-ethylhexyl acrylate copolymer or 2-ethylhexyl acrylate terpolymer. The inorganic particles may be formed of silicon oxide, aluminum oxide, titanium oxide, zirconium oxide, magnesium fluoride, for example. Other materials may be used.

The first beads 1030 may be provided in an amount of about 1 to 10 parts by weight based on the resin 1035. When an amount of the first beads 1030 based on the resin 1035 is equal to or greater than 1 part by weight, it is easy to diffuse light from the light source. When an amount of the first beads 1030 based on the resin 1035 is equal to or less than 10 parts by weight, a reduction in a transmittance of the light from the light source may be prevented.

Diameters of the first beads 1030 distributed inside the resin 1035 may be non-uniform. The first beads 1030 may be completely distributed inside the resin 1035 not to project from the surface of the resin 1035.

As described above, light incident on the optical sheet is reflected several times by the plurality of first beads distributed inside the lens portion and is diffused while a travel path of the light changes. Therefore, the first beads may improve a luminance by focusing the light.

Figure 21:
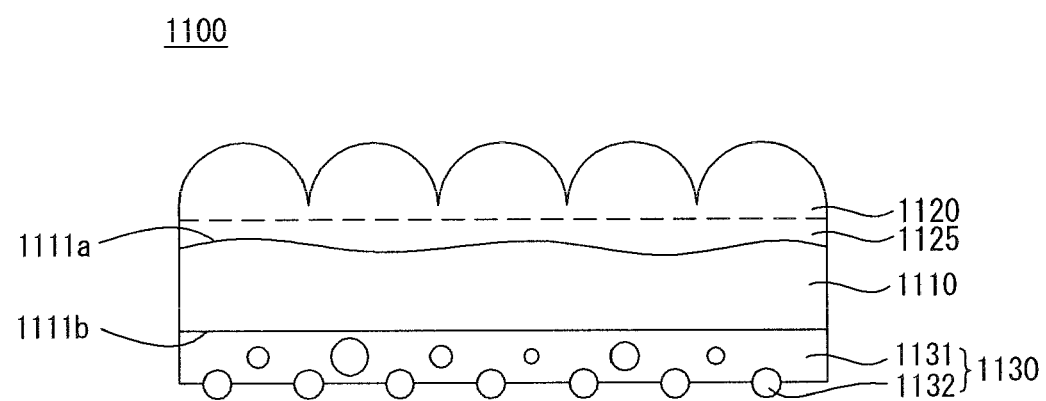
FIG. 21 is a cross-sectional view of an optical sheet according to an eleventh exemplary embodiment.

FIG. 21 is a cross-sectional view of an optical sheet according to an eleventh exemplary embodiment.

As shown in FIG. 21, an optical sheet 1100 according to the eleventh exemplary embodiment may include a base film 1110, a lens portion 1120 on the base film 1110, and a protective layer 1130 under the base film 1110.

The base film 1110 may include a first surface 1111a and a second surface 1111b opposite the first surface 1111a. The base film 1110 may have a first thickness T1 between the first surface 1111a and the second surface 1111b and a second thickness T2 between the first surface 1111a and the second surface 1111b. The first thickness T1 may be different from the second thickness T2.

Since configurations of the base film 1110 and the lens portion 1120 including a base layer 1125 are similar to or the same as those described in the above exemplary embodiments, a further description may be briefly made or may be entirely omitted.

The protective layer 1130 may improve a thermal resistance of the optical sheet 1100. The protective layer 1130 may include a resin 1131 and a plurality of second beads 1132 distributed inside the resin 1131.

The resin 1131 may use transparent acrylic-based resin with excellent thermal resistance and excellent mechanical characteristics. The resin 1131 may be similar to or the same as that described in the above exemplary embodiments.

The second beads 1132 may be formed of the same material as or a different material from the resin 1131. The second beads 1132 may be provided in an amount of about 10 to 50 parts by weight based on the resin 1131.

Diameters of the second beads 1132 may be properly selected depending on the thickness of the base film 1110 and may be approximately 2 μm to 10 μm.

In the eleventh exemplary embodiment, the diameters of the second beads 1132 may be uniform or non-uniform. The second beads 1132 may be uniformly or non-uniformly distributed inside the resin 1131.

The second beads 1132 may be formed of the same material as or a different material from the first beads described in the above exemplary embodiments.

The protective layer 1130 may prevent the optical sheet from being deformed by light coming from a light source. The protective layer 1130 may prevent generation of a flaw on the optical sheet caused by an external impact or mechanical force.

A backlight unit and a liquid crystal display that will be described below may include the optical sheets according to the first to eleventh exemplary embodiments. Hereinafter, the backlight unit and the liquid crystal display including the optical sheets according to three exemplary embodiments of the first to eleventh exemplary embodiments as an example of the optical sheet will be described. However, the invention is not limited thereto.

Figure 22:
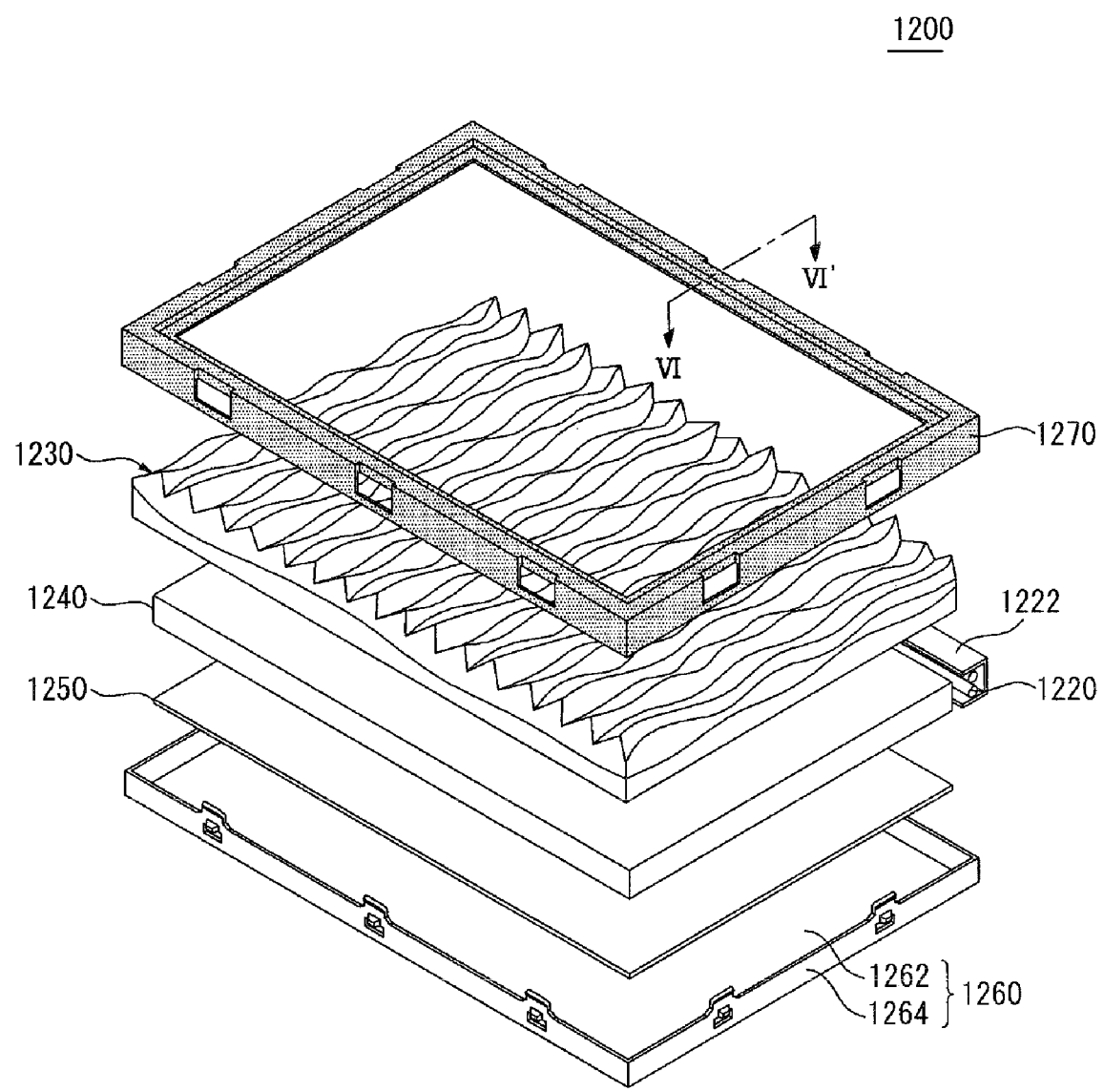
FIGS. 22 and 23 illustrate a configuration of a backlight unit including an optical sheet according to an exemplary embodiment.
Figure 23:
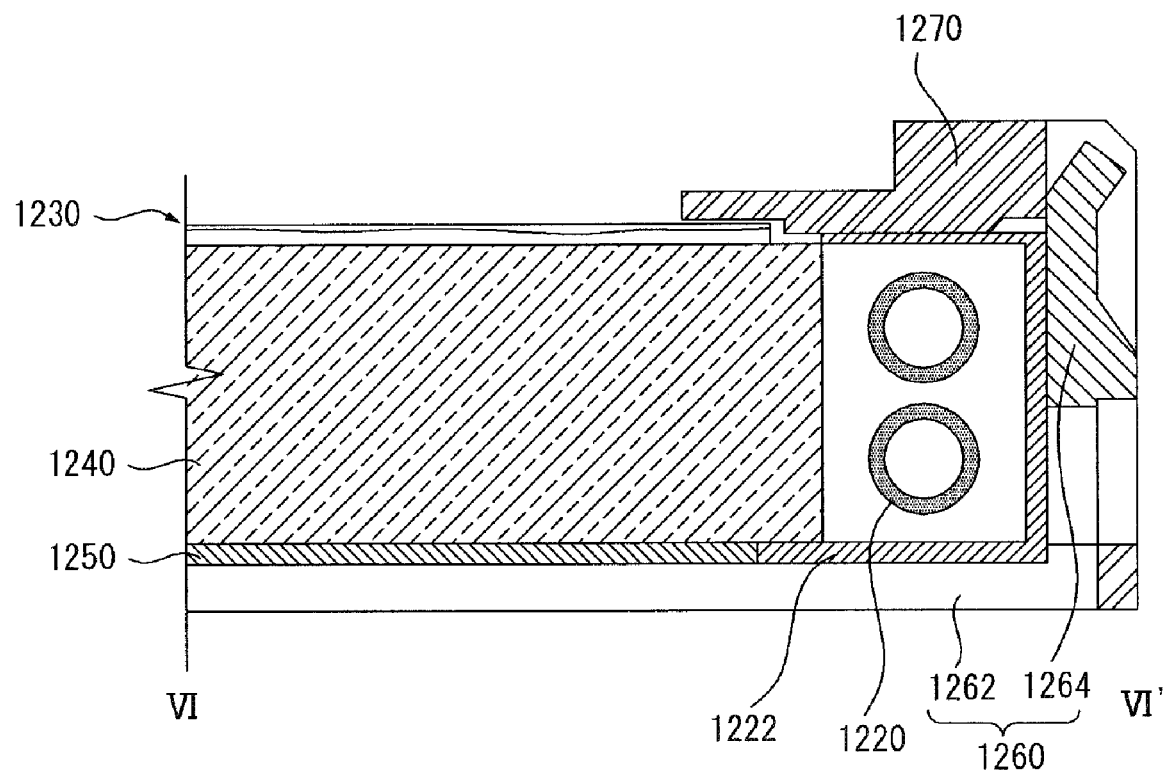

FIGS. 22 and 23 are an exploded perspective view and a cross-sectional view illustrating a configuration of a backlight unit according to an exemplary embodiment. Other embodiments and configurations are also within the scope of the invention.

FIG. 22 shows an edge type backlight unit.

As shown in FIGS. 22 and 23, a backlight unit 1200 may be included in a liquid crystal display and may provide light to a liquid crystal display panel included in the liquid crystal display.

The backlight unit 1200 may include a light source 1220 and an optical sheet 1230. The backlight unit 1200 may further include a light guide 1240, a reflector 1250 (or reflector plate), a bottom cover 1260, and a mold frame 1270.

The light source 1220 may produce light using a drive power received from outside the light source 1220 and may emit the produced light.

The light source 1220 may be positioned at one side of the light guide 1240 along a long axis direction of the light guide 1240. The light source 1220 may be positioned at both sides of the light guide 1240. Light from the light source 1220 may be directly incident on the light guide 1240. Alternatively, the light from the light source 1220 may be reflected by a light source housing 1222 surrounding a portion of the light source 1220, for example, surrounding about ¾ of an outer circumferential surface of the light source 1220, and then the light may be incident on the light guide 1240.

The light source 1220 may be one of a cold cathode fluorescent lamp (CCFL), a hot cathode fluorescent lamp (HCFL), an external electrode fluorescent lamp (EEFL), and a light emitting diode (LED). Other light sources may also be used.

The optical sheet 1230 may be positioned on the light guide 1240. The optical sheet 1230 may focus the light from the light source 1220.

The optical sheet 1230 may use all the optical sheets according to the first to eleventh exemplary embodiments. Therefore, the optical sheet 1230 may achieve a uniform luminance and may improve a light diffusivity by changing a shape of a base film. The display quality of the backlight unit 1200 including the optical sheet 1230 may be improved.

The light guide 1240 may face the light source 1220. The light guide 1240 may guide the light so as to emit the light from the light source 1220 in an upward manner.

The reflector 1250 may be positioned under the light guide 1240. The reflector 1250 may reflect the light upward. The light may come from the light source 1220 and then may be emitted downward via the light guide 1240.

The bottom cover 1260 may include a bottom portion 1262 and a side portion 1264 extending from the bottom portion 1262 to form a recipient space. The recipient space may receive the light source 1220, the optical sheet 1230, the light guide 1240, and the reflector 1250.

The mold frame 1270 may be an approximately rectangular-shaped frame. The mold frame 1270 may be fastened to the bottom cover 1260 from an upper side of the bottom cover 1260 in a top-down manner.

Figure 24:
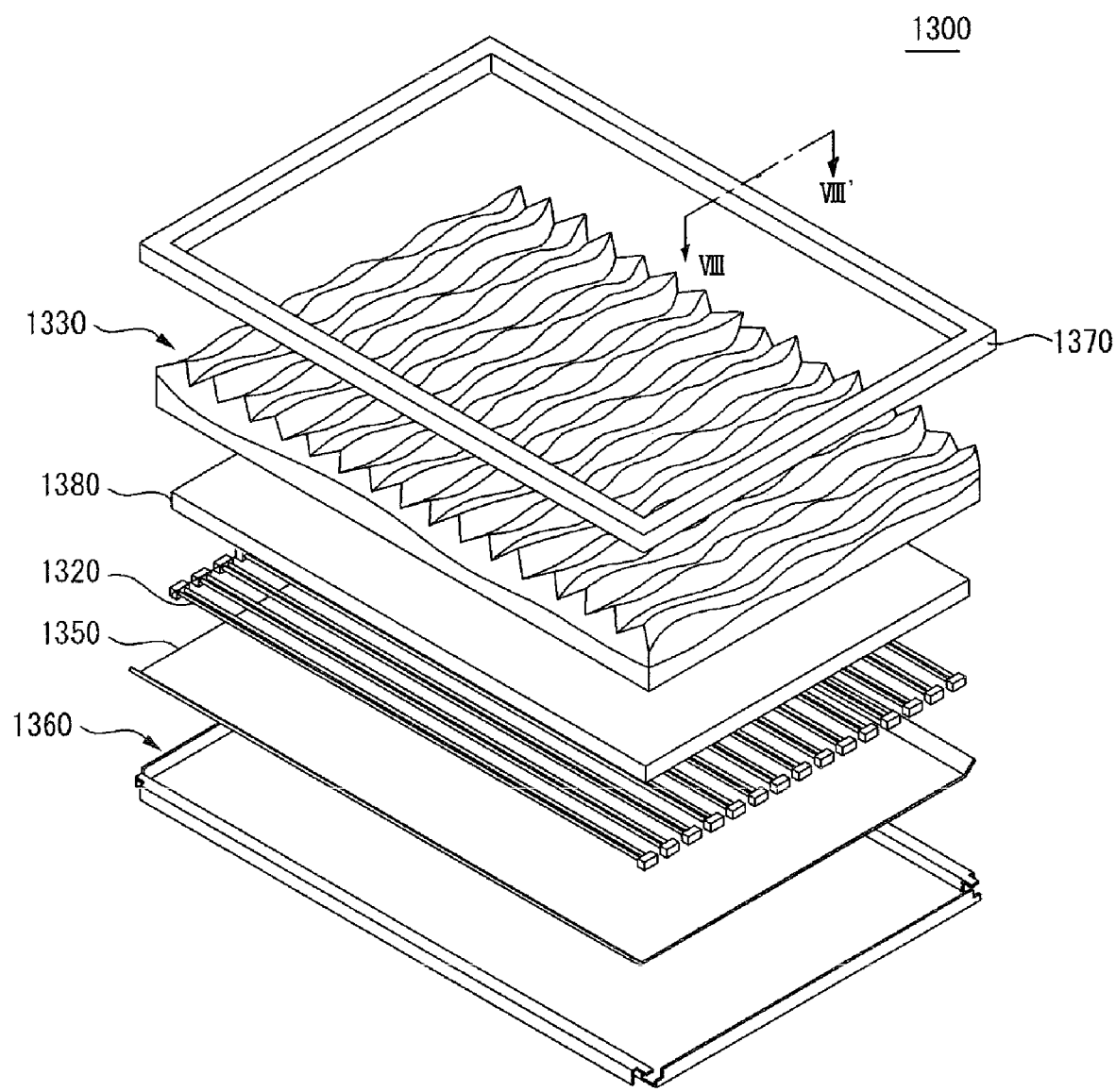
FIGS. 24 and 25 illustrate a configuration of a backlight unit according to an exemplary embodiment.
Figure 25:
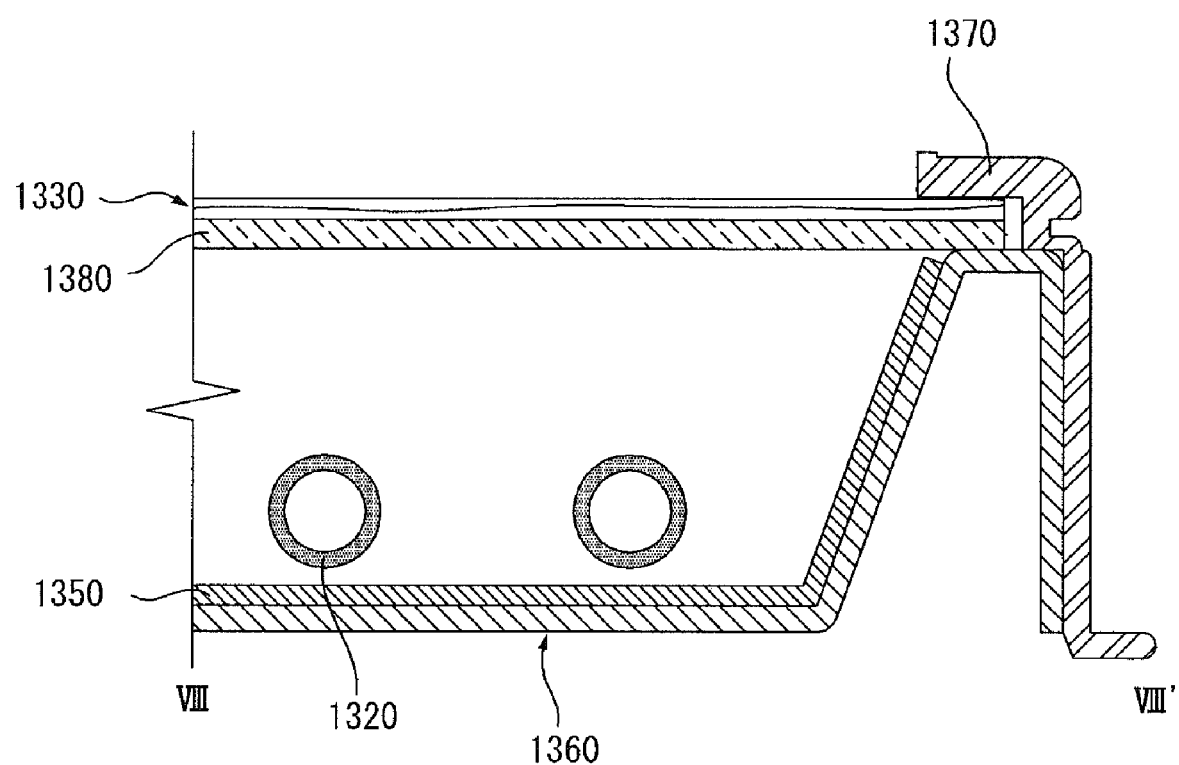

FIGS. 24 and 25 are an exploded perspective view and a cross-sectional view illustrating a configuration of a backlight unit according to an exemplary embodiment. Other embodiments and configurations are also within the scope of the invention.

FIGS. 24 and 25 show a direct type backlight unit. Since a backlight unit 1300 shown in FIGS. 24 and 25 may be substantially the same as the backlight unit shown in FIGS. 22 and 23 (except a location of a light source and changes in components depending on location of the light source), a further description may be briefly made or may be entirely omitted.

As shown in FIGS. 24 and 25, the backlight unit 1300 may be included in a liquid crystal display and may provide light to a liquid crystal display panel included in the liquid crystal display.

The backlight unit 1300 may include a light source 1320 and an optical sheet 1330. The backlight unit 1300 may further include a reflector 1350 (or reflector plate), a bottom cover 1360, a mold frame 1370, and a diffusion plate 1380 (or diffuser).

The light source 1320 may be positioned under the diffusion plate 1380. Therefore, light from the light source 1320 may be directly incident on the diffusion plate 1380.

The optical sheet 1330 may be positioned on the diffusion plate 1380. The optical sheet 1330 may focus the light from the light source 1320.

The optical sheet 1330 may use all the optical sheets according to the first to eleventh exemplary embodiments. Therefore, the optical sheet 1330 may achieve a uniform luminance and may improve a light diffusivity by changing a shape of a base film. The display quality of the backlight unit 1300 including the optical sheet 1330 may be improved.

The diffusion plate 1380 may be positioned between the light source 1320 and the optical sheet 1330 and may diffuse the light from the light source 1320 in an upward manner. A shape of the light source 1320 underlying the diffusion plate 1380 may not be seen from a top of the backlight unit 1300 because of the diffusion plate 1380. The diffusion plate 1380 may further diffuse the light from the light source 1320.

Figure 26:
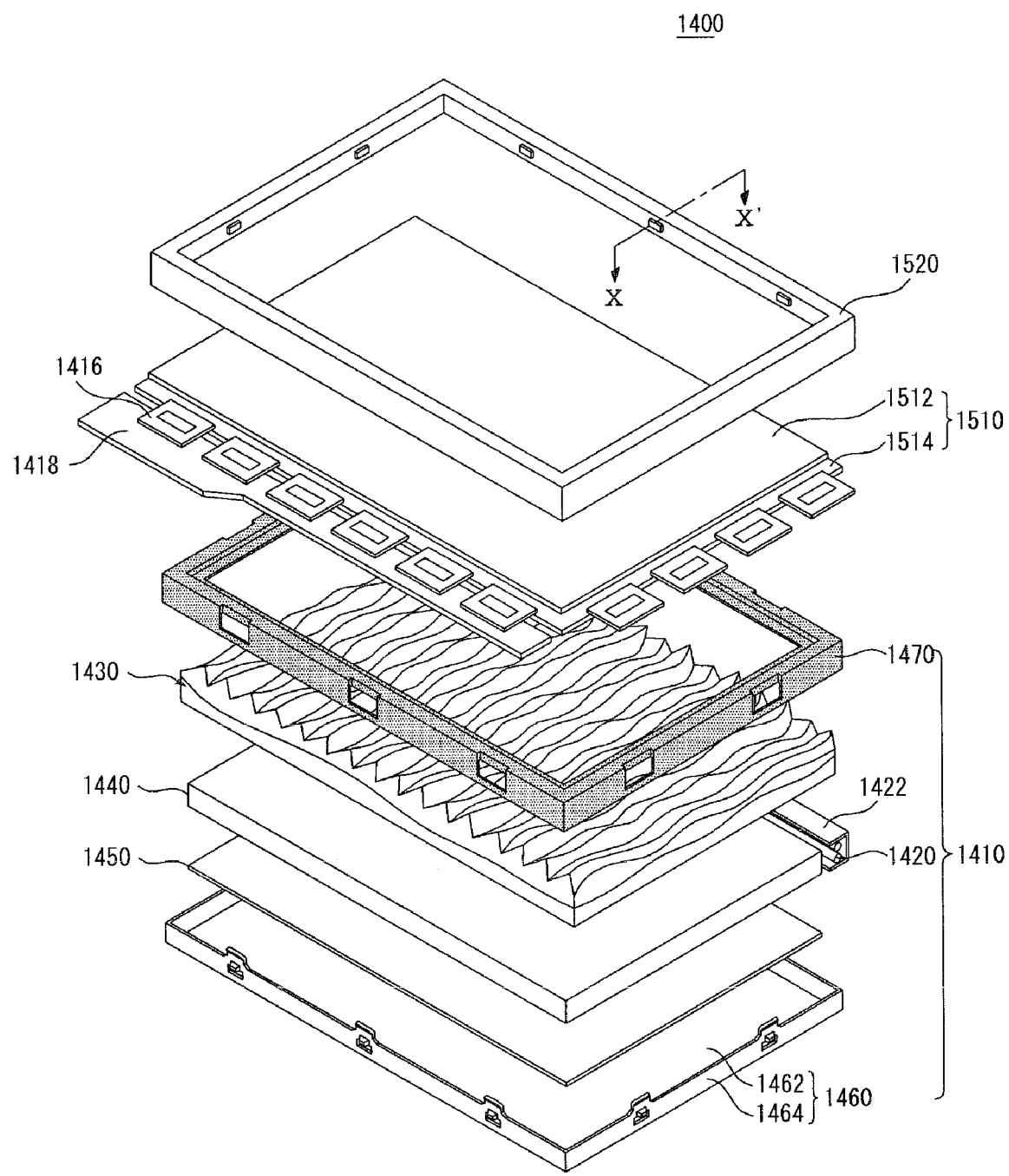
FIGS. 26 and 27 illustrate a configuration of a liquid crystal display according to an exemplary embodiment.
Figure 27:
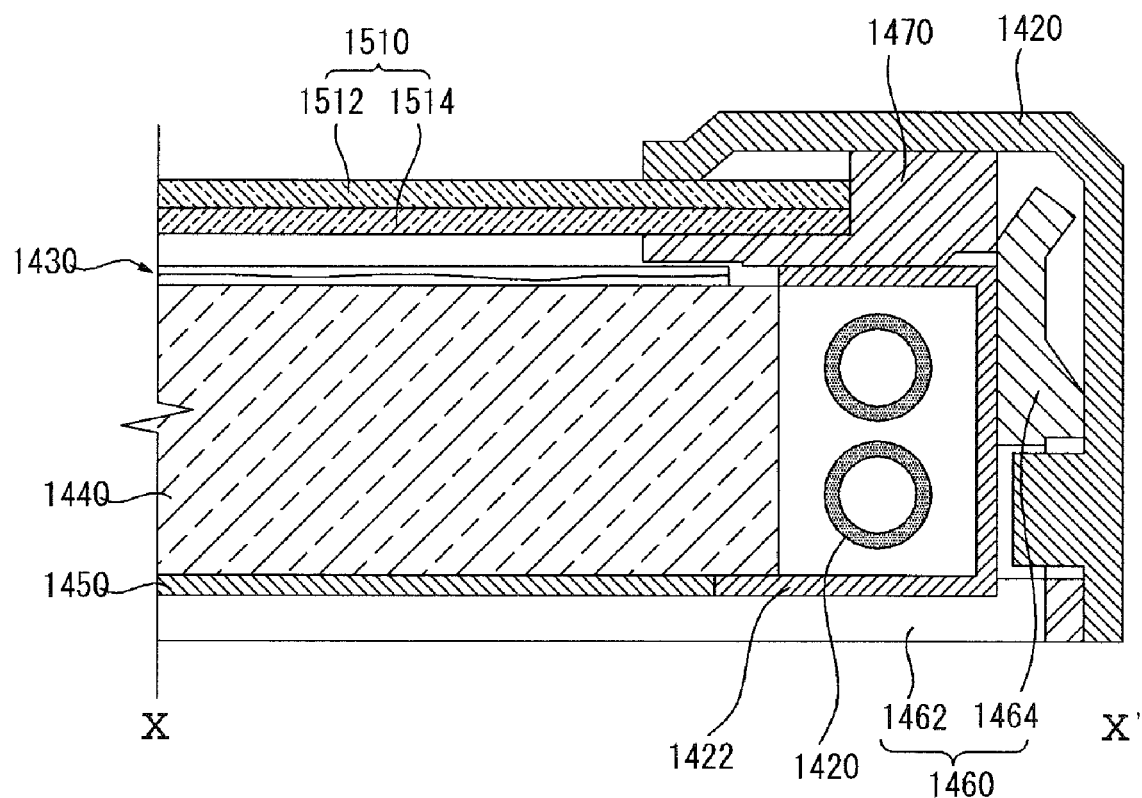

FIGS. 26 and 27 are an exploded perspective view and a cross-sectional view illustrating a configuration of a liquid crystal display according to an exemplary embodiment. Other embodiments and configurations are also within the scope of the invention.

A liquid crystal display 1400 shown in FIGS. 26 and 27 may include the backlight unit shown in FIGS. 22 and 23. For example, the liquid crystal display 1400 may include a backlight unit 1410 similar to the backlight unit shown in FIGS. 24 and 25. Since the backlight unit 1410 shown in FIGS. 26 and 27 is described above with reference to FIGS. 22 and 23, a further description thereof will be briefly made or will be entirely omitted.

As shown in FIGS. 26 and 27, the liquid crystal display 1400 may display an image using electro-optical characteristics of liquid crystals.

The liquid crystal display 1400 may include the backlight unit 1410 and a liquid crystal display panel 1510.

The backlight unit 1410 may be positioned under the liquid crystal display panel 1510 and may provide light to the liquid crystal display panel 1510. The backlight unit 1410 may include a light source 1420 and an optical sheet 1430. Light from the light source 1420 may be reflected by a light source housing 1422. The backlight unit 1410 may further include a light guide 1440 (or light guide plate), a reflector 1450 (or reflector plate), a bottom cover 1460, and a mold frame 1470.

The liquid crystal display panel 1510 may be positioned on the mold frame 1470. The liquid crystal display panel 1510 may be fixed by a top cover 1520 that is fastened to the bottom cover 1460 in a top-down manner. The bottom cover 1460 may include a bottom portion 1462 and a side portion 1464 extending from the bottom portion to form a recipient space.

The liquid crystal display panel 1510 may display an image using light provided by the light source 1420 of the backlight unit 1410.

The liquid crystal display panel 1510 may include a color filter substrate 1512 and a thin film transistor substrate 1514 that are opposite to each other with liquid crystals interposed between the color filter substrate 1512 and the thin film transistor substrate 1514.

The color filter substrate 1512 may achieve colors of an image displayed on the liquid crystal display panel 1510.

The color filter substrate 1512 may include a color filter array of a thin film form on a substrate made of a transparent material, such as glass or plastic. For example, the color filter substrate 1512 may include red, green, and blue color filters. An upper polarizing plate may be positioned on the color filter substrate 1512.

The thin film transistor substrate 1514 may be electrically connected to a printed circuit board 1418, on which a plurality of circuit parts are mounted, through a drive film 1416. The thin film transistor substrate 1514 may apply a drive voltage provided by the printed circuit board 1418 to the liquid crystals in response to a drive signal provided by the printed circuit board 1418.

The thin film transistor substrate 1514 may include a thin film transistor and a pixel electrode on another substrate made of a transparent material, such as glass or plastic. A lower polarizing plate may be positioned under the thin film transistor substrate 1514.

The optical sheet, the backlight unit including the optical sheet, and the liquid crystal display including the backlight unit according to the exemplary embodiments may simultaneously diffuse and focus light by providing the plurality of beads in the projection.

The backlight unit and the liquid crystal display including the optical sheet according to the exemplary embodiments may prevent generation of a flaw on the optical sheet caused by bringing another sheet on the projection into contact with the projection because the peaks and the valleys of the projection have the curved or non-flat surface.

The optical sheet, the backlight unit including the optical sheet, and the liquid crystal display including the backlight unit according to the exemplary embodiments may improve the thermal resistance and the mechanical strength by further including the protective layer under the base film.

The optical sheet, the backlight unit including the optical sheet, and the liquid crystal display including the backlight unit according to the exemplary embodiments may improve the light diffusivity and achieve the uniform luminance by including the base film whose one surface has the curved or non-flat surface.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An optical sheet comprising:
a base film including a first surface and a second surface, the first surface being an opposite surface of the second surface and having peaks and valleys, wherein the base film has a first thickness T1 between one of the peaks of the first surface and the second surface and a second thickness T2 between one of the valleys of the first surface and the second surface, the first thickness being different from the second thickness; and projections provided over the first surface of the base film, the projections comprising peaks and valleys and a base portion, which is provided adjacent to the first surface of the base film, wherein a plurality of first beads is provided in the projections and a position of at least one of the valleys of the projections does not align to a position of at least one of the valleys of the base film.

2. The optical sheet of claim 1, wherein the first thickness T1 is a thickness measured along a vector substantially perpendicular to one surface of the base film, and the second thickness T2 is a thickness substantially parallel to the first thickness T1.

3. The optical sheet of claim 1, wherein the first and second thicknesses T1 and T2 substantially satisfy the following equation: $0.1\ \mu m \leq |T1-T2| \leq 10\ \mu m$.

4. The optical sheet of claim 1, further comprising a first primer layer on the base film.

5. The optical sheet of claim 4, further comprising a second primer layer under the base film.

6. The optical sheet of claim 5, wherein the first primer layer or the second primer layer is formed of at least one selected from the group consisting of acrylic-based, ester-based, and urethane-based polymer materials.

7. The optical sheet of claim 5, wherein a thickness of the second primer layer is approximately 5 nm to 300 nm.

8. The optical sheet of claim 4, wherein a thickness of the first primer layer is approximately 5 nm to 300 nm.

9. The optical sheet of claim 1, wherein the projections comprises one of a prism, a microlens, and a lenticular lens.

10. The optical sheet of claim 9, wherein at least one of the peaks and the valleys meanders in an uneven pattern.

11. The optical sheet of claim 9, wherein a height of at least one of the peaks varies along a longitudinal direction of the prism.

12. The optical sheet of claim 1, wherein a height of the base portion is approximately 5% to 50% of a height of one of the peaks.

13. The optical sheet of claim 1, wherein the peaks, the valleys, and the base portion form an integral body of the plurality of projections.

14. The optical sheet of claim 1, further comprising a protective layer under the base film, the protective layer including a resin and plurality of second beads.

15. A backlight unit comprising:
at least one light source; and
an optical sheet adjacent the at least one light source, the optical sheet including:
a base film having a first surface and a second surface, the first surface being opposite of the second surface and having peaks and valleys, wherein the base film has a first thickness between one of the peaks of the first surface and the second surface and a second thickness between one of the valleys of the first surface and the second surface, the first thickness being different from the second thickness, and
projections provided over the first surface of the base film, the projections comprising peaks and valleys and a base portion, which is provided adjacent to the first surface of the base film,
wherein a plurality of beads is provided in the projections and a position of at least one the valleys of the projections does not align to a position of at least one of the valleys of the base film.

16. A liquid crystal display comprising:
a light source;
a liquid crystal panel; and
an optical sheet provided between the light source and the liquid crystal panel, the optical sheet including:
a base film including a first surface and a second surface, the first surface being an opposite surface of the second surface and having peaks and valleys, wherein the base film has a first thickness T1 between one of the peaks of the first surface and the second surface and a second thickness T2 between one of the valleys of the first surface and the second surface, the first thickness being different from the second thickness, and
projections provided over the first surface of the base film, the projections comprising peaks and valleys and a base portion, which is provided adjacent to the first surface of the base film,
wherein a plurality of beads is provided in the projections, and a position of at least one of the valleys of the projections does not align to a position of at least one of the valleys of the base film.

\* \* \* \* \*